United States Patent [19]
Nishimura et al.

[11] Patent Number: 5,817,932
[45] Date of Patent: Oct. 6, 1998

[54] INTAKE AIR FLOW MEASURING APPARATUS FOR INTERNAL COMBUSTION ENGINE

[75] Inventors: Yutaka Nishimura; Izumi Watanabe, both of Hitachinaka, Japan

[73] Assignees: Hitachi, Ltd.; Hitachi Car Engineering Co., Ltd., both of Japan

[21] Appl. No.: 510,571

[22] Filed: Aug. 2, 1995

[30] Foreign Application Priority Data

Aug. 2, 1994 [JP] Japan ................................. 6-181546
Sep. 7, 1994 [JP] Japan ................................. 6-213426

[51] Int. Cl.⁶ ............................................... G01M 15/00
[52] U.S. Cl. ..................... 73/118.2; 73/202.5; 73/204.11
[58] Field of Search .......................... 73/115, 116, 117.2, 73/117.3, 118.1, 118.2, 202.5, 204.11, 204.14, 204.17, 170.12; 701/101

[56] References Cited

U.S. PATENT DOCUMENTS

| | | | |
|---|---|---|---|
| 4,304,129 | 12/1981 | Kawai et al. | 73/118.2 |
| 4,457,167 | 7/1984 | Sumal | 73/118.2 |
| 4,478,075 | 10/1984 | Oyama et al. | 73/118.2 |
| 4,517,837 | 5/1985 | Oyama et al. | 73/118.2 |
| 4,527,530 | 7/1985 | Abe et al. | 73/118.2 |
| 4,555,937 | 12/1985 | Sumal | 73/118.2 |
| 4,571,990 | 2/1986 | Honig | 73/118.2 |
| 4,669,301 | 6/1987 | Kratt et al. | 73/118.2 |
| 4,694,806 | 9/1987 | Wataya et al. | 73/118.2 |
| 4,719,890 | 1/1988 | Wataya et al. | 73/118.2 |
| 4,774,833 | 10/1988 | Weibler et al. | 73/118.2 |
| 4,829,819 | 5/1989 | Lefteriou et al. | 73/204.21 |
| 4,884,215 | 11/1989 | Zboralski et al. | 73/118.2 |
| 4,986,122 | 1/1991 | Gust | 73/204.15 |
| 5,003,950 | 4/1991 | Kato et al. | 73/118.2 |
| 5,014,550 | 5/1991 | Gee et al. | 73/118.2 |
| 5,241,857 | 9/1993 | Schnaibel et al. | 73/118.2 |
| 5,355,726 | 10/1994 | Zurek et al. | 73/118.2 |
| 5,517,971 | 5/1996 | Nishimura et al. | 73/118.2 |

FOREIGN PATENT DOCUMENTS

| | | |
|---|---|---|
| 0 044 873 | 2/1982 | European Pat. Off. . |
| 0 154 393 | 9/1985 | European Pat. Off. . |
| 55-139938 | 11/1980 | Japan . |
| 56-106159 | 8/1981 | Japan . |
| 59-176450 | 10/1984 | Japan . |
| 62-14705 | 4/1987 | Japan . |
| 1-185416 | 7/1989 | Japan . |
| 2-290513 | 11/1990 | Japan . |
| 5-10612 | 2/1993 | Japan . |
| 5-54890 | 8/1993 | Japan . |
| 913259 | 3/1982 | U.S.S.R. . |
| 1711084 A1 | 2/1992 | U.S.S.R. . |
| 1 488 012 | 10/1977 | United Kingdom . |

*Primary Examiner*—George M. Dombroske
*Attorney, Agent, or Firm*—Evenson, McKeown, Edwards & Lenahan, P.L.L.C.

[57] ABSTRACT

An intake air flow measuring apparatus for internal combustion engine apparatus has a thermal type air flow meter, a unit for correcting the response delay of the thermal type air flow meter, and a unit for detecting the direction of the flow of intake air so that an amount of reverse air flow is detected by the response delay correcting unit and air flow direction unit, and that a true amount of sucked air flow is calculated from the output of the thermal type air flow meter and the amount of reverse air flow.

11 Claims, 27 Drawing Sheets

SIGNAL $V_{t,i}$ WITHOUT DELAY
FROM AIR FLOW METER, WHERE $$C_1 = \frac{\{1+A(T_2-T_1)\}/\Delta t}{1+\{1+A(T_2-T_1)\}/\Delta t} \qquad C_2 = \frac{1+(T_1+T_2)/\Delta t + T_1 \times T_2/(\Delta t)^2}{1+\{1+A(T_2-T_1)\}/\Delta t}$$

$$C_3 = \frac{(T_1+T_2)/\Delta t + 2 \times T_1 \times T_2/(\Delta t)^2}{1+\{1+A(T_2-T_1)\}/\Delta t} \qquad C_4 = \frac{T_1 \times T_2/(\Delta t)^2}{1+\{1+A(T_2-T_1)\}/\Delta t}$$

$\Delta t$ IS VERY SHORT TIME

INTAKE AIR FLOW MEASURING APPARATUS FOR INTERNAL COMBUSTION ENGINE

BACKGROUND OF THE INVENTION

This invention relates to an air flow meter for measuring the amount of intake air flow in internal combustion engine.

The air flow meter using the principle of a thermal resistance type including a hot-wire type air flow meter has been widely used as an air flow meter for an electronically-controlled type fuel injection system of a vehicle, because it has advantages of small size and high speed response and capable of direct measurement of mass air flow. However, the thermal resistance type or hot-wire type air flow meter has the disadvantage that it cannot detect the direction of flow. If the air flow to be measured is a pulsatile flow including a reverse flow as when a throttle valve is wide open throttle, a large error may occur. In order for this problem to be solved, the signal from the hot-wire type flow meter was multiplied by a correction coefficient as described in the Japanese Patent Examined Publication No. JP-B-62-14705. This method, however, was a symptomatic treatment with low precision, and in this method a long time was taken for development of system since the correction coefficient was determined by experiment. In addition, another method is proposed in the Japanese Patent Unexamined Laid-open No. JP-A-1-185416, in which the direction of air flow is detected from the difference between signals from the hot-wire type air flow meter having two heat-generating resistors provided on a single electric insulator.

To measure a pulsatile flow including a reverse flow, it can be considered that air flow direction detecting means is added to attach minus sign to the signal from the air flow meter when the flow is reverse and plus sign to the signal when the flow is forward and that those plus and minus values are integrated and averaged. FIG. 20 shows the waveforms of signals from the air flow meter at this time. In the hot-wire type air flow meter having the normal response delay, the pulsating amplitude of signal is reduced because of a response delay, and the air flow signal of the reverse part is greatly increased as compared with the true reverse flow. As a result, when only the air flow direction detecting means is added, the hot-wire type air flow meter having the normal response delay indicates a smaller measured average air flow than the true value.

SUMMARY OF THE INVENTION

It is an object of the invention to provide a intake air flow measuring apparatus capable of measuring an average value of a pulsatile air flow including a reverse flow at high precision.

According to one embodiment of the invention, there is provided an intake air flow measuring apparatus having a thermal type air flow meter, means for correcting the response delay of the signal from the air flow meter, and means for detecting the direction of air flow, so that an amount of air flow is produced from the thermal type air flow meter, an amount of reverse air flow is determined by use of the response delay correcting means and air flow direction detecting means, those amounts of air flow during an intake stroke period are added, and the amount of reverse air flow is multiplied by 2 and subtracted from the sum, thereby estimating a true amount of air flow sucked into the engine.

When a pulsatile flow including a reverse flow is measured, the direction of air flow cannot be detected from the signal from the normal hot-wire type air flow meter, and the signal has a response delay as shown in FIG. 20. However, the average value of the amounts of air flow approximately coincides with that obtained when the reverse flow is treated as a forward flow. The waveform of the signal from the normal hot-wire flow meter with response delay can be approximated to the true waveform of air flow by response delay correcting means. In addition, the true amount of reverse air flow can be determined by accumulating the corrected amounts of reverse air flow by use of the flow direction detecting means. Therefore, the average amount of air flow including reverse flow can be estimated by subtracting the latter true amount of reverse air multiplied by 2 from the former average value obtained when the reverse flow is treated as a forward flow. The latter amount of reverse air flow is an approximate value obtained by the correction, i.e., has an error. However, since the amount of reverse air flow in the air sucked into the engine is considerably small as compared with the amount of forward air flow, the error has little effect on the average amount of air flow, and thus the average amount of air flow can be calculated at high accuracy.

Moreover, in a hot-wire type flow meter having two heat-generating resistors on a single electrical insulator, means are provided for determining the direction of the air flow by comparing the signals from the two resistors of the air flow meter, estimating the amount of air flow from the signal which the more-heat generating resistor produces, attaching plus sign to the forward flow signal and minus sign to the reverse flow signal, adding those amounts of forward and reverse flow, and then calculating the average amount of air flow.

When the air flow is a pulsatile flow including a reverse flow, the direction and amount of air flow are measured at constant intervals of time. When the air flow is reverse, the flow signal is attached with minus sign and added so that the average amount of air flow can be calculated. Thus, even if the air flow is a pulsatile flow including a reverse flow, the average amount of air flow can be calculated correctly.

Incidentally, the thermal type air flow meter or hot-wire type air flow meter according to the present invention can use thin-film heat generating resistors or semiconductors other than the hot wires as the heat generating resistors.

DESCRIPTION OF THE PREFERRED EMBODIMENTS

Figure 1:
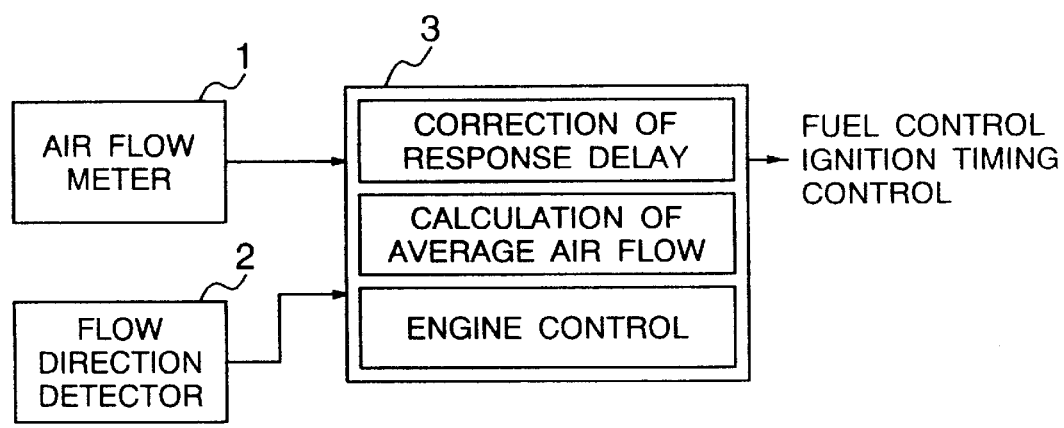
FIG. 1 is a block diagram of the air flow measuring apparatus according to the invention.

FIG. 1 shows an air flow measuring apparatus of the invention. Referring to FIG. 1, the signals from a hot-wire type air flow meter 1 and flow-direction detecting unit 2 are fed to an engine control circuit 3. The engine control circuit 3 corrects the response delay of the signal from the hot-wire type air flow meter 1, calculates the average value of air flow by using the signals from the flow meter 1 and detecting unit 2 and estimates the amount of fuel, ignition timing and so on so that those values are used in controlling the engine.

Figure 2:
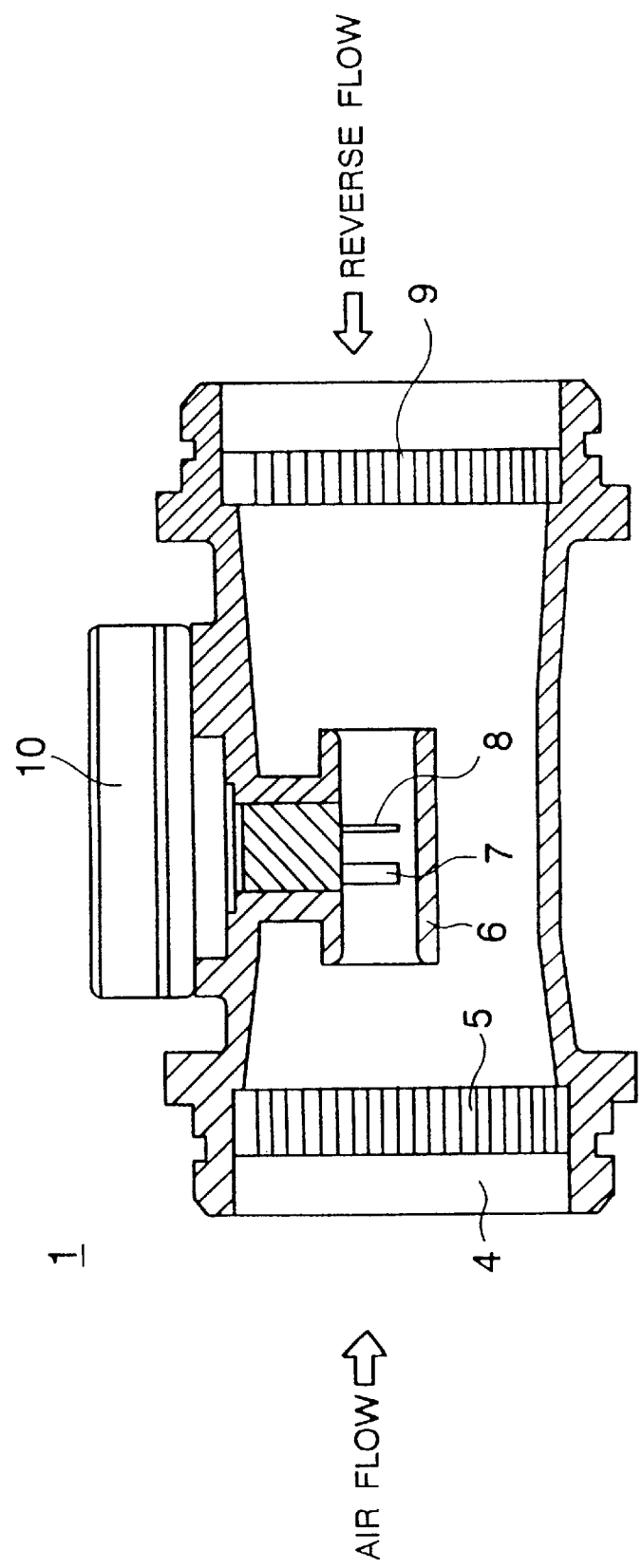
FIG. 2 shows the detailed construction of the hot-wire type air flow meter in FIG. 1.

FIG. 2 shows a detailed construction of the flow meter 1 in FIG. 1. There are shown rectifying members 5, 9 and an inner cylinder 6 which are provided within an air path 4. The inner cylinder 6 includes an air flow detector 7 with a flow direction detecting function and an air temperature detector 8. Shown at 10 is an electric circuit of the hot-wire air flow meter 1. When the air flow is forward, it is rectified to be uniform by the rectifying member 5 and inner cylinder 6, and the amount of the air flow is measured by the air flow detector 7 and air temperature detector 8. When the air flow is reverse, it is rectified to be uniform by the rectifying member 9 and inner cylinder 6, and the magnitude of the air flow is similarly measured by the air flow detector 7 and air temperature detector 8. The forward and reverse flows can be measured at high precision by the provision of the rectifying members 5, 9 at the inlet and outlet of the air path 4.

Figure 3:
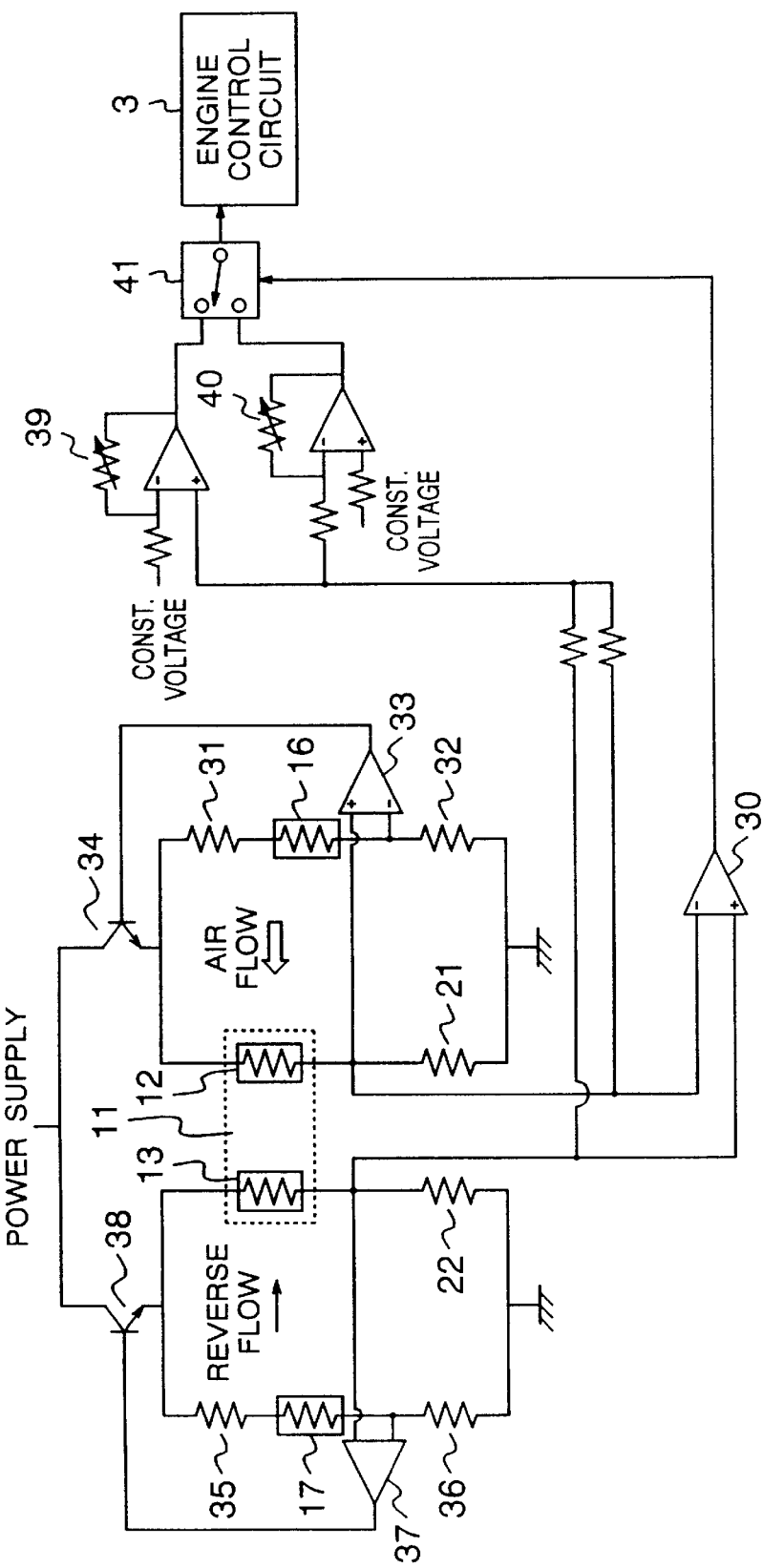
FIG. 3 is a detailed circuit diagram of the electronic circuits of the hot-wire type air flow meter in FIG. 1.
Figure 4:
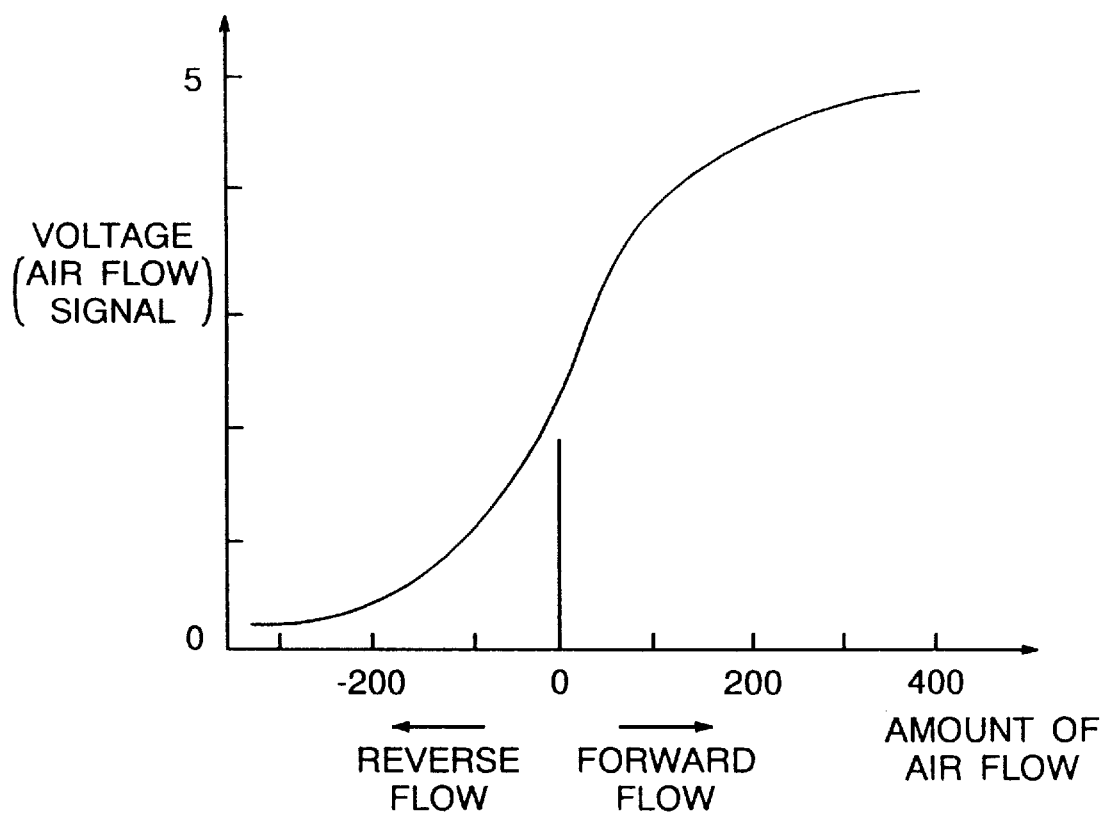
FIG. 4 is a graph showing the relation between signal and air flow including the direction of flow.

FIG. 3 is a detailed electronic circuit diagram of the flow meter 1 shown in FIG. 1. This circuit arrangement includes two hot-wire type air flow meters. The direction of air flow is determined by the comparison between the signals from the flow meters, and the air flow signal is formed by the sum of both signals. Thus, this circuit arrangement produces the combination of the air flow signal and the flow direction signal. The air flow detector has two heat-generating resistors 12, 13 provided on a thin electric insulating plate 11. One of the hot-wire type air flow meters is formed by a Wheatstone bridge having the heat-generating resistor 12, a temperature compensation resistor 16 and resistors 21, 32, 31, a differential amplifier 33 and a transistor 34. The other one is formed by a Wheatstone bridge having the heat-generating resistor 13, a temperature compensation resistor 17 and resistors 22, 35, 36, a differential amplifier 37 and a transistor 38. The air flow signals from the two hot-wire type air flow meters, or the potentials at the lower ends of the heat-generating resistors 12, 13 are compared to each other by a comparator 30 so that the direction signal of air flow is produced from the comparator. The compared output is fed as a control signal to an analog switch 41. Since the signal at the upstream-side heat-generating resistor relative to the air flow is larger than that at the downstream-side heat-generating resistor, the air flow direction signal can be obtained. As to the air flow signal, the sum of the potentials at the lower ends of the heat-generating resistors 12, 13 is adjusted in the magnitude-signal relation by differential amplifiers 39, 40 and passed through the analog switch 41 which is controlled by the flow direction signal, so that the air flow signal is increased with the magnitude of air flow when the air flow is forward and decreased when the air flow is reverse as shown in FIG. 4. The signal from the switch 41 is fed to the engine control circuit 3. Thus, if the relationship between the signal and the magnitude of air flow is established by use of the flow direction signal and analog switch 41 as shown in FIG. 4, the flow signal including the flow direction can be transmitted through a single signal line to the engine control circuit 3.

Figure 5:
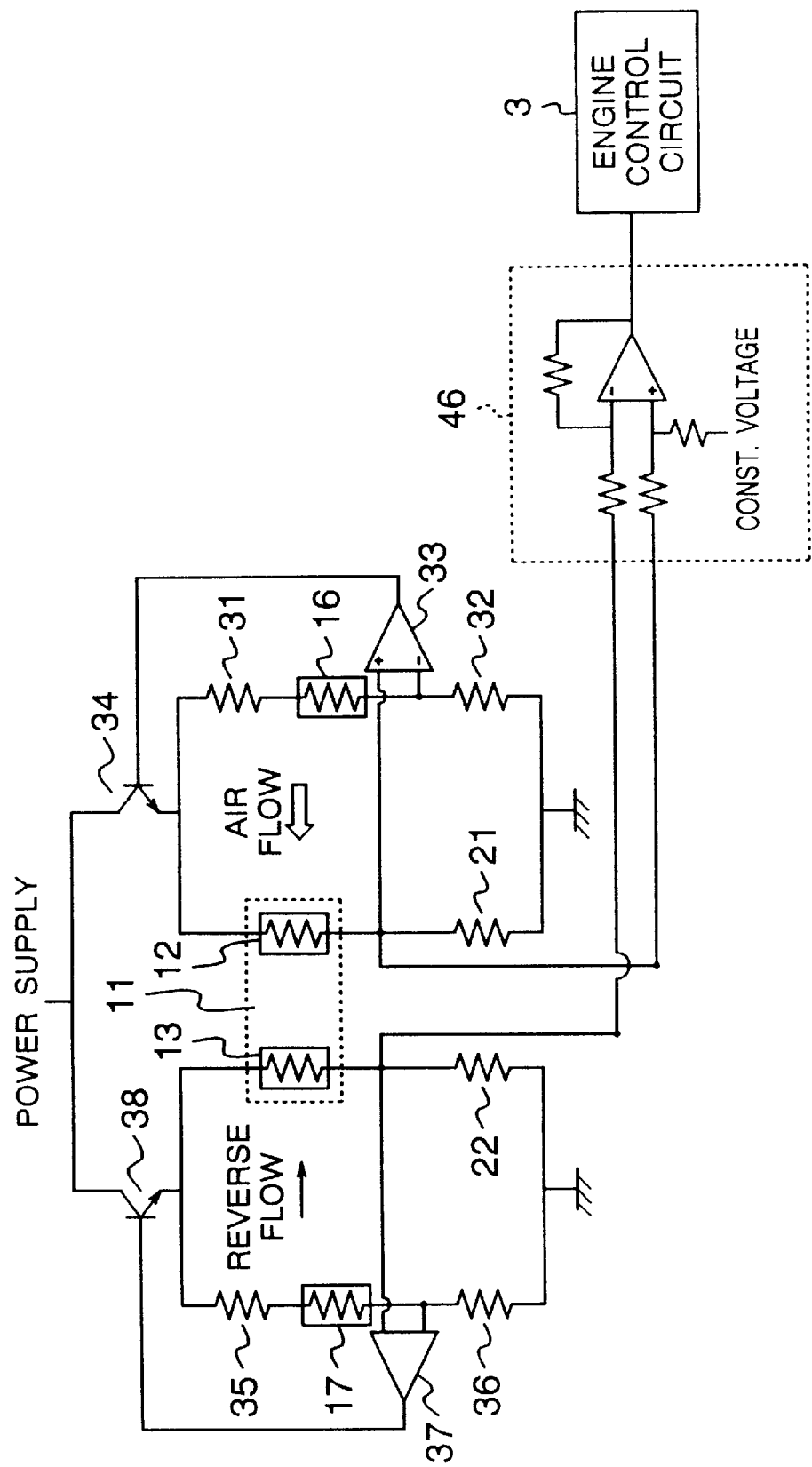
FIG. 5 shows a modification of the circuit diagram of FIG. 3.

FIG. 5 is a modification of the arrangement of FIG. 3. This arrangement includes two hot-wire type air flow meters and forms the air flow signal by the difference between both signals. In FIG. 5, like elements corresponding to those in FIG. 3 are identified by the same reference numerals. The difference between the potentials at the lower ends of the heat-generating resistors 12, 13 is adjusted in the signal-magnitude relation by a differential amplifier 46 and fed as the flow signal to the engine control circuit 3. The relationship between the signal and the magnitude of air flow is shown in FIG. 4. The air flow signal including the flow direction can be transmitted through a single signal line to the engine control circuit 3.

Figure 6:
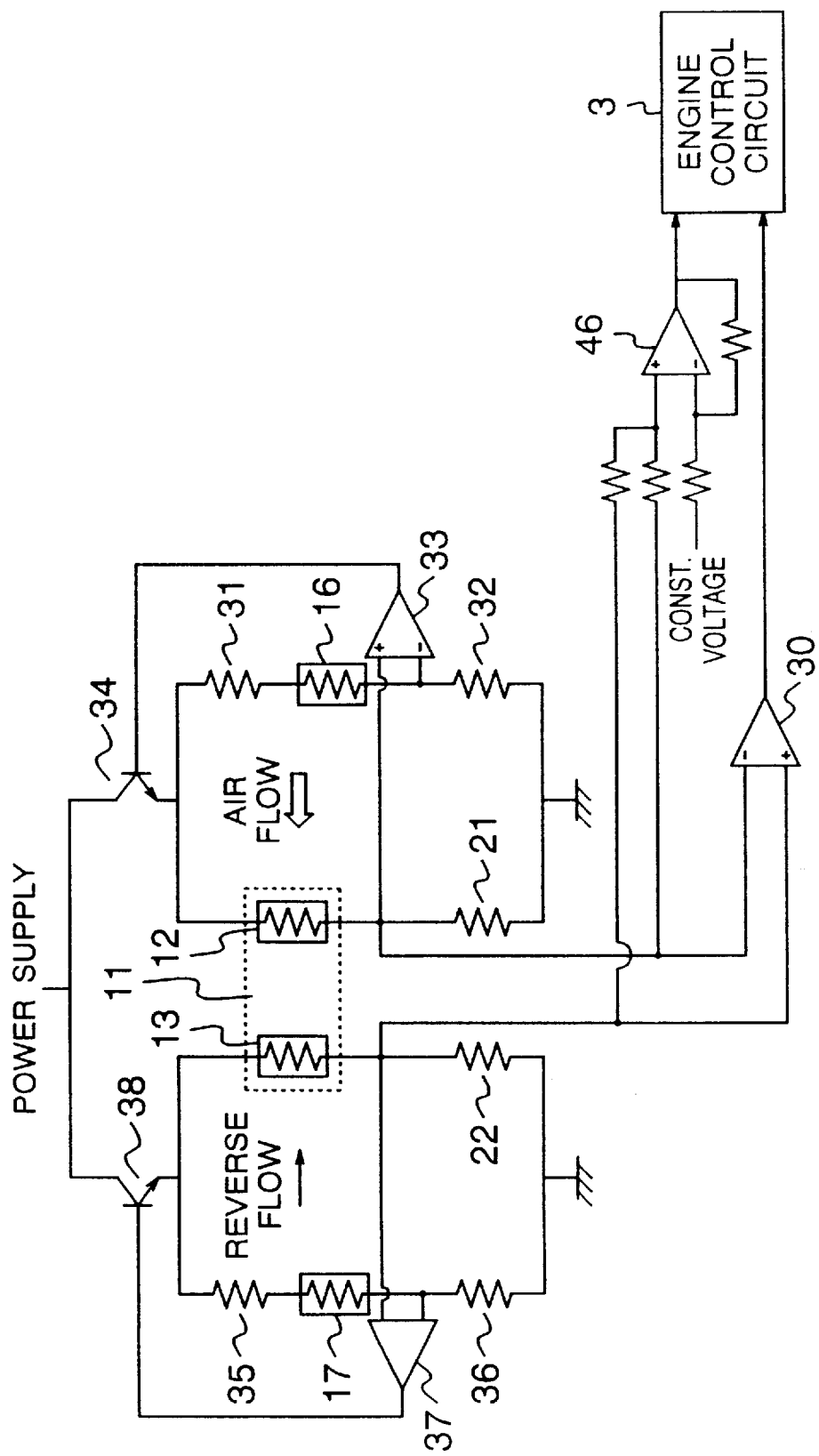
FIG. 6 is another modification of the diagram of FIG. 3.
Figure 7:
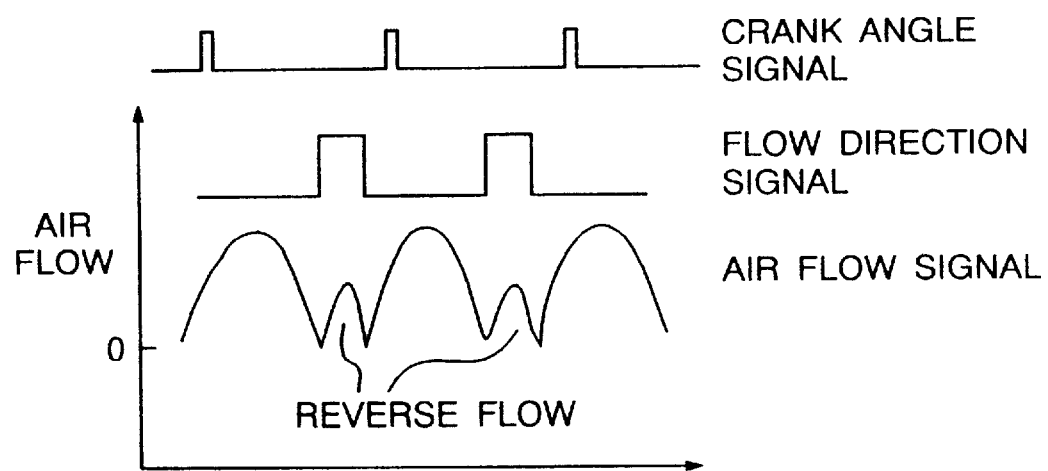
FIG. 7 is a waveform diagram of flow-direction signal and flow signal.
Figure 8:
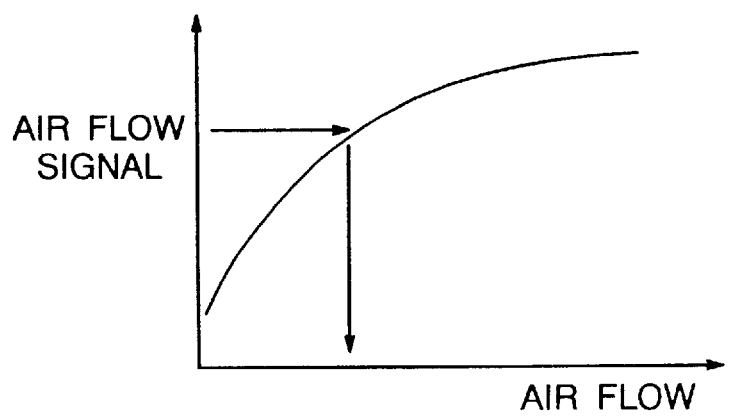
FIG. 8 shows a curve as a table to which reference is made in determining air flow from flow signal.

FIG. 6 is another modification of the arrangement of FIG. 3. In this arrangement, the flow direction signal and air flow signal are separately transmitted through two wires to the engine control circuit 3. Since the flow direction signal and flow signal are separately supplied, the air flow signal can be read with high precision. In FIG. 6, like elements corresponding to those in FIG. 3 are identified by the same reference numerals. As to the air flow signal, the sum of the potentials at the lower ends of the heat-generating resistors 12, 13 is adjusted in the signal-magnitude relation by the differential amplifier 46 and fed to the engine control circuit 3. As to the air flow direction signal, the potentials at the lower ends of the heat-generating resistors 12, 13 are compared to each other by the comparator 30, and the compared output is fed to the engine control circuit 3. FIGS. 7 and 8 show examples of the air flow direction signal and air flow signal which are fed to the engine control circuit 3.

Figure 9:
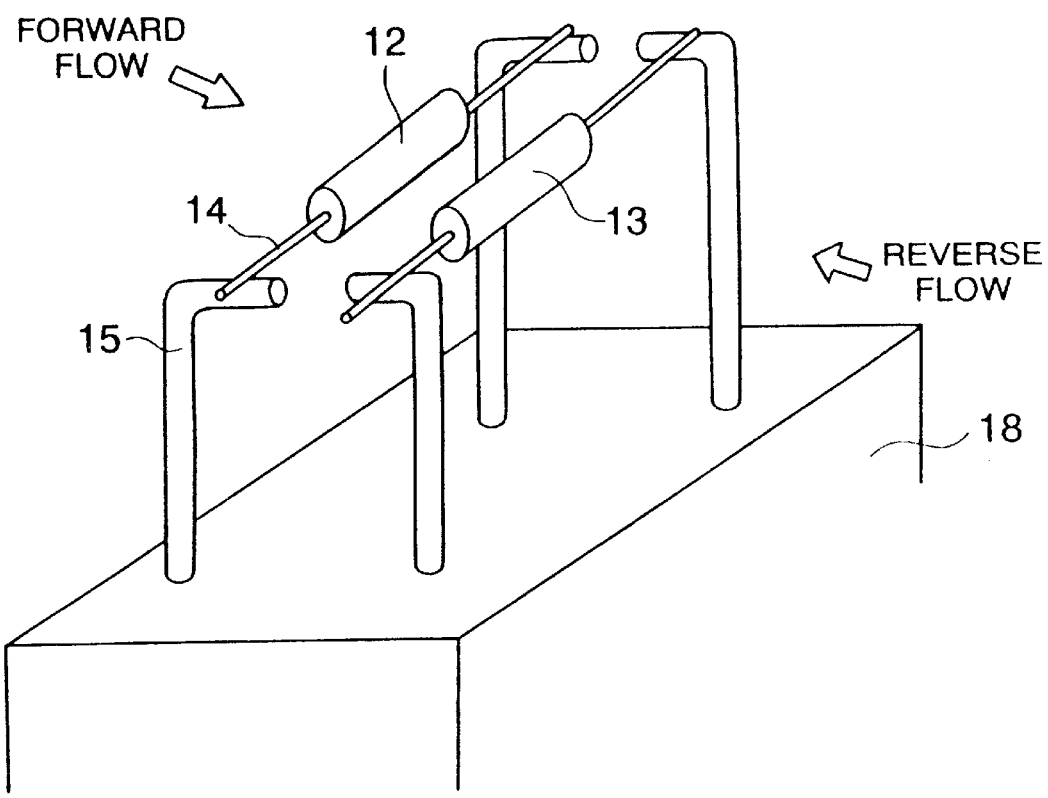
FIG. 9 shows heat-generating resistors 12, 13.

FIG. 9 shows a specific example of the heat-generating resistors 12, 13. The heat-generating resistors 12, 13 have such structure as disclosed in the Japanese Patent Unexamined Laid-open Publication No. JP-A-56-106159 and U.S. Pat. No. 4,517,837. That is, each of the resistors is formed of a thin platinum wire wound around a cylindrical alumina bobbin or it is formed of a thin platinum film deposited on the alumina bobbin and a glass coating on the film. The resistors 12, 13 are spaced about 0.1 mm to 1.5 mm in parallel from each other in the air flow direction and mounted through supports 14, 15 onto a fixed wall 18, so as to be perpendicular to the air flow and at upstream and downstream positions. The support 14 is formed thinner than the support 15 so that the generated heat from the resistors is little conducted to the fixed wall, resulting in the increase of the precision with which the air flow amount is measured.

Figure 10:
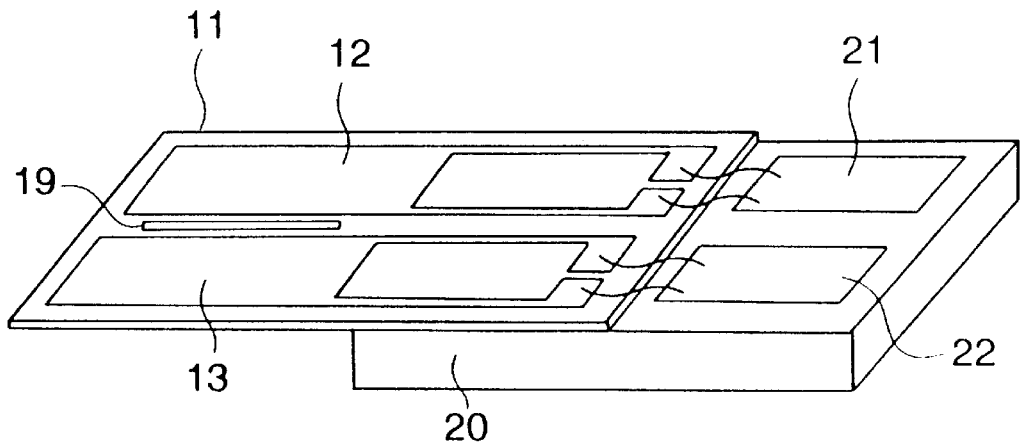
FIG. 10 is a modification of the air flow meter shown in FIG. 9.

FIG. 10 is a modification of the construction of FIG. 9. The two heat-generating resistors 12, 13 are provided on a single electrically insulating plate (made of ceramics, plastic or silicon material) 11. A slit 19 is also formed in the plate between the two resistors 12, 13 so as to cut off the heat conduction between the resistors 12, 13. The electrically insulating plate 11 is most preferably 0.05 to 0.1 mm thick from the standpoint of both thermal capacity and mechanical strength. This plate 11 is bonded onto a ceramic plate 20 with a glass adhesive or others. The heat-generating resistors 12, 13 are electrically connected to the resistors 21, 22 on the ceramic plate 20 by aluminum wire bonding or other wire bonding. This construction, as compared with that of FIG. 9, has the effect that the resistors 12, 13 can always be arranged in proper positions relative to the air flow.

Figure 20:
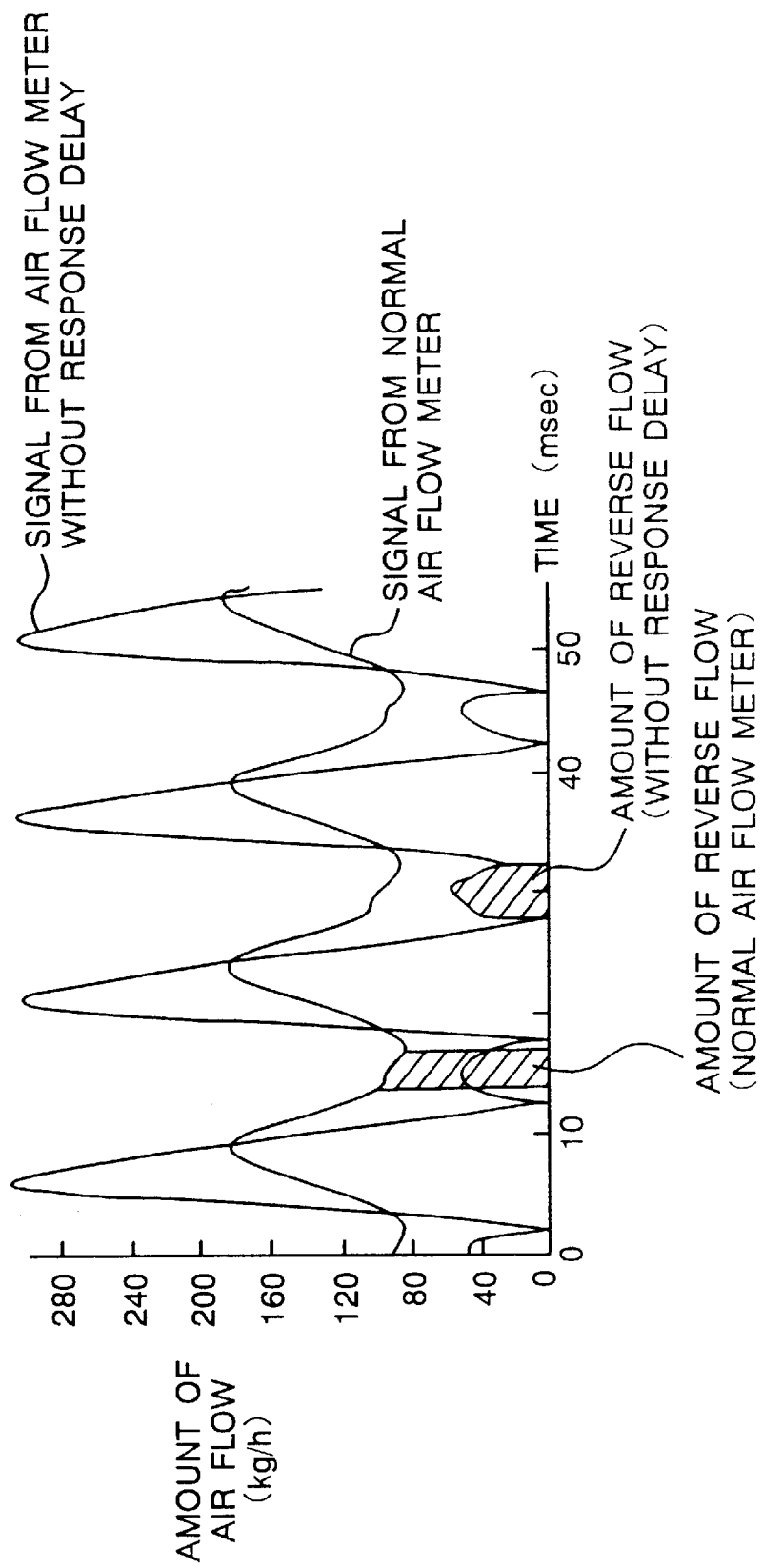
FIG. 20 is a waveform diagram of signals from the hot-wire type flow meter.

The resistors 12, 13 shown in FIGS. 9 and 10 exhibit good durability when used in automobiles, but have a slightly large thermal capacity, resulting in slow response to the change of air flow as shown in FIG. 20.

Figure 11:
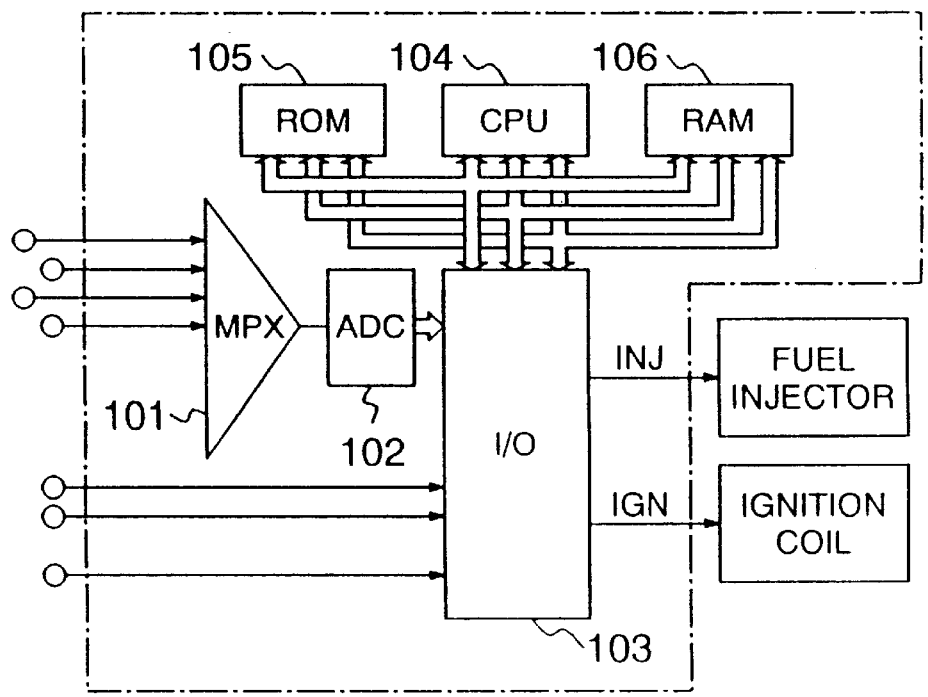
FIG. 11 is a block diagram of the engine control circuit 3.

FIG. 11 is a detailed block diagram of the engine control circuit 3. The outputs from the analog switch 41 and differential amplifier 42 are supplied to a multiplexer 101 where they are selected in a time sharing manner. The output from the multiplexer 101 is fed to an A/D converter 102 by which it is converted into a digital signal. The output from the comparator 30 and pulse signals of crank angle, key switch and so on are supplied to an I/O 103. A CPU 104 makes digital calculation, a ROM 105 is a memory device for storing a control program and data, and a RAM 106 is a readable and writable memory device. The I/O 103 has the functions that it supplies the input signals to the CPU 104 and supplies the received output signals from the CPU 104 to the fuel injection valve and ignition coil.

Figure 12:
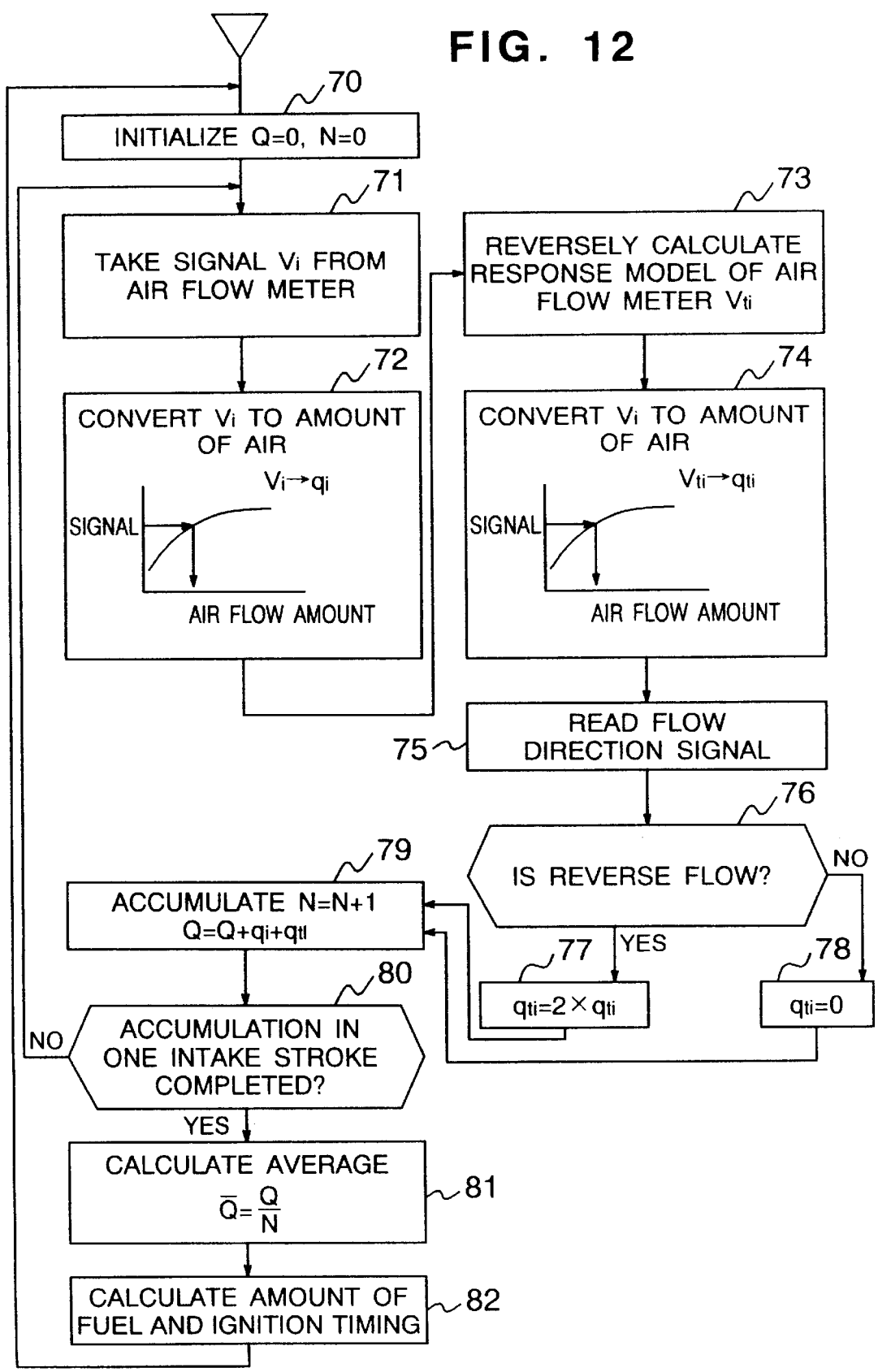
FIG. 12 is a flowchart for the calculation of average air flow.

FIG. 12 is a flowchart for calculating the average amount of air within the engine control circuit 3. The air flow signal is converted to a magnitude of air flow according to the table shown in FIG. 4 or 8, and the converted values are added one by one. At the same time, the air flow signal is corrected for its response delay by arithmetic operation, and the corrected air flow signal is converted to a magnitude of air flow by use of the table shown in FIG. 4 or 8. In addition, the amount of reverse flow is estimated by the air flow direction detecting unit. The amount of reverse flow is subtracted from the air flow accumulation and the average value of air flow is calculated.

At step 70 the initial values are reset to zero, and at step 71 the signals from the hot-wire type flow meters are received at constant intervals of time or at every constant crank angles. At step 72 the received values are converted to amounts of air flow qi according to the table shown in FIG. 4 or 8. At step 73 reverse calculation is made on the response model of the hot-wire type flow meters, thus producing flow signals with no delay. At step 74 the flow signals with no delay are converted to amounts of air flow qti according to the table shown in FIG. 4 or 8. At steps 75, 76 the air flow is decided to be forward or reverse from the flow direction signal. If the air flow is forward, the amount of air flow after correction of response delay is set to zero at step 78. If the air flow is reverse, the amount of air flow after correction of response delay is doubled and attached with minus sign at step 77. At step 79 the value qi obtained at step 72 is added to the value qti produced at steps 77, 78, and the number of additions N is counted. At step 80 decision is made of whether the additions in one inlet stroke are completed. If the additions are completed, the program goes to step 81. If the additions are not completed yet, the program goes back to step 71 and the operation at step 79 is repeated. The additions in one intake stroke are made during the interval between the leading and trailing edges of the crank angle signal shown in FIG. 7 (in the four-cylinder engine, at every 180-degree crank angles). Therefore, the end of the adding operation is decided from the fact that the crank angle signal has risen up or not. At step 81 the added value, or accumulation Q of the air flow magnitudes is divided by the number of additions N so that the average amount of flow is obtained. At step 82 the amount of fuel to be fed and ignition timing are calculated.

Figure 13:
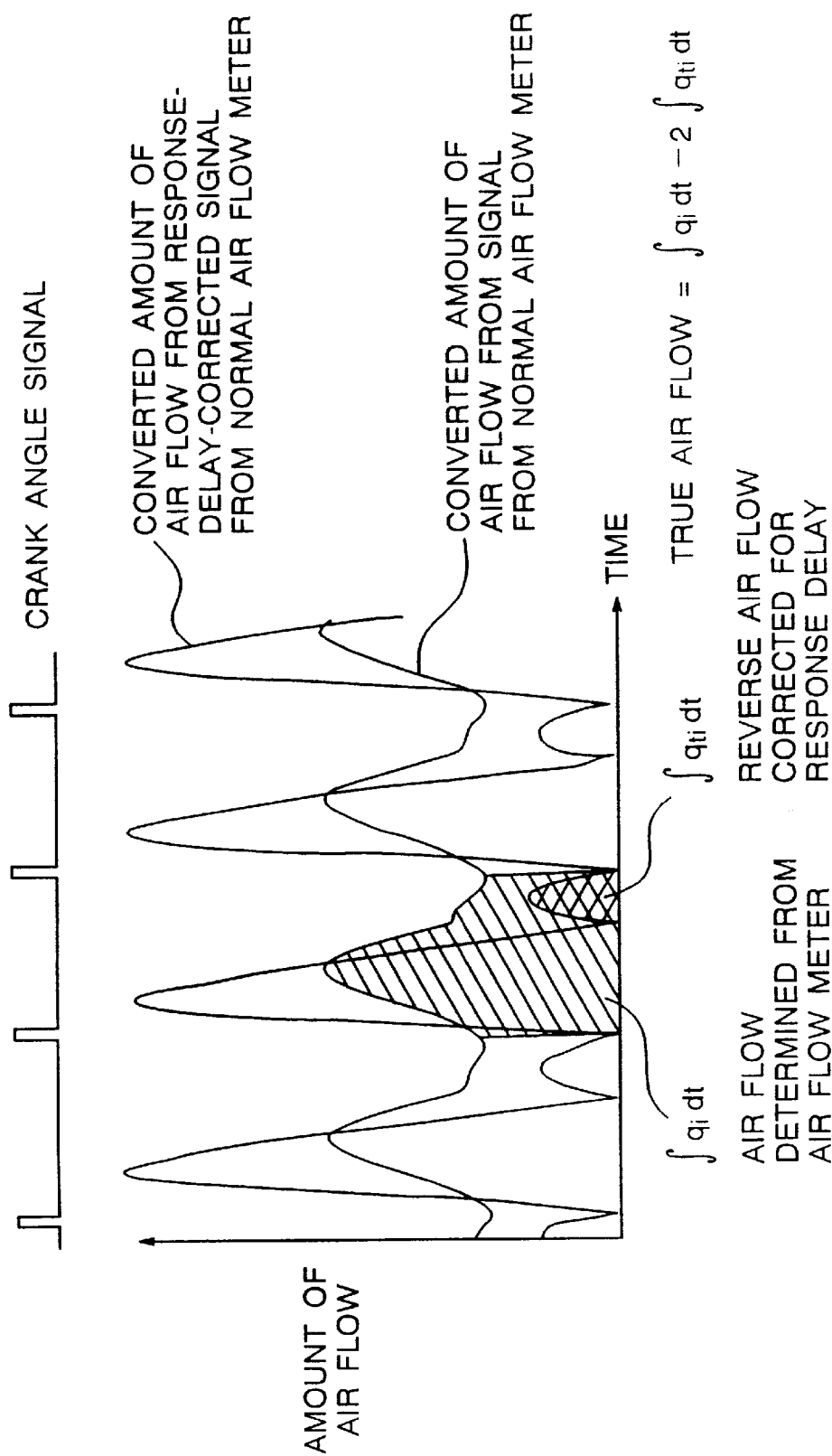
FIG. 13 is a diagram to which reference is made in explaining the flowchart of FIG. 12.

FIG. 13 is a diagram to which reference is made in explaining the flowchart of FIG. 12. The amount of air flow is estimated from the values from the hot-wire type air flow meters, and the amount of reverse flow is found by use of the response delay correcting unit and air flow direction detecting unit. During an intake stroke, the amounts of air flow are added and twice the amount of reverse air flow is subtracted from the added amount of air flow, thereby deriving the true amount of air sucked into the engine. In other words, the accumulated amount of air in an intake stroke is estimated from the values from the hot-wire type flow meter 1, the amount of reverse air is determined by the response delay correcting unit and air flow direction detecting unit, and the amount of reverse flow multiplied by 2 is subtracted from the accumulated amount of air flow. However, since the speed of air flow within the air path 4 dose not take uniform distribution with ease when the air flow is reverse, the multiplication factor by which the amount of reverse flow is multiplied should be selected to be a value between 1 and 2 instead of 2.

Figure 14:
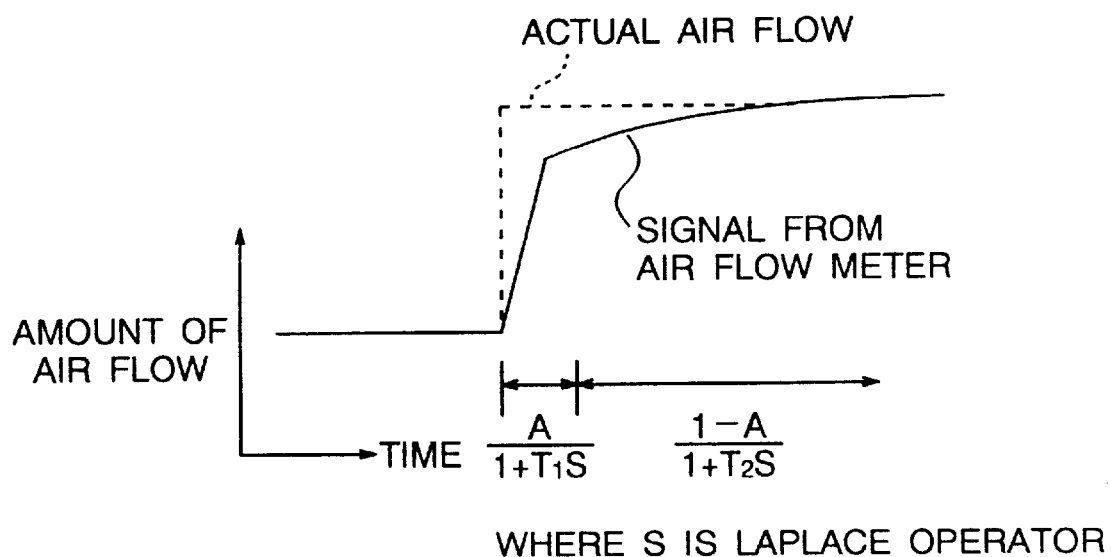
FIG. 14 is a graph showing the change of signal from the hot-wire type flow meter when the air flow is stepwise changed.
Figure 15:
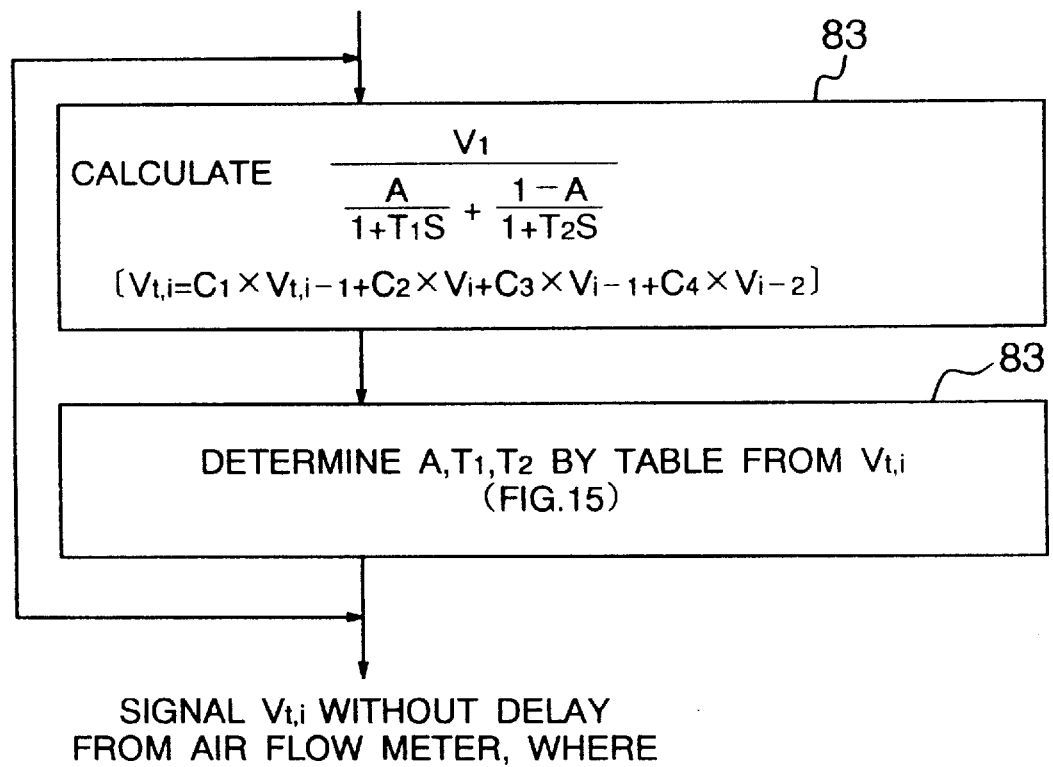
FIG. 15 shows the details of step 73.
Figure 16:
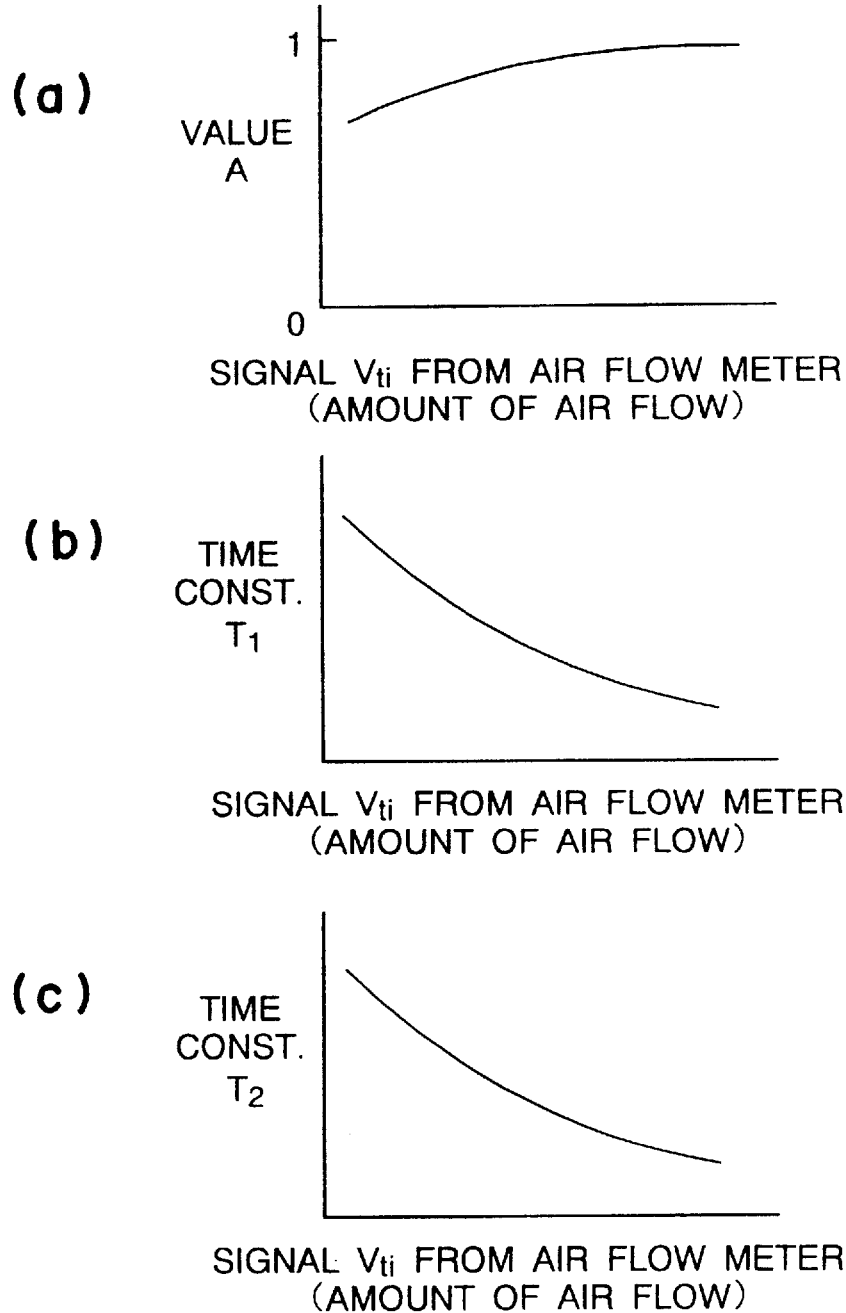
FIG. 16 shows examples of tables of constants A, T1, T2 for response delay of flow meter.

The operation at step 73 in FIG. 12 will be described in detail with reference to FIGS. 14, 15 and 16. FIG. 14 shows the change of the signal from the hot-wire type flow meter with the stepwise change of the amount of air flow. As described in the Japanese Patent Unexamined Laid-open Publication No. JP-A-59-176450, the step response of the signal from the hot-wire type flow meter is expressed by the sum of two time constants, the first one of which is determined by the constant of the hot-wire type electronic circuit, and the second one of which is determined by the thermal capacity of the flow amount detector. The step 73 is the process in which the signal Vi from the hot-wire type flow meter 1 is reversely converted into the air flow signal Vti with no delay by use of this response model. The details of this step is shown in FIG. 15. At step 83 the signal Vi is reversely converted by use of this response model. The air flow signal Vti with no delay is obtained by solving a differential equation of two time constants T1, T2 of primary delay. At step 84 the constants A, T1, T2 of primary delay are estimated from the obtained air flow signal Vti by use of the table shown in FIG. 16. Since the values of these constants strongly depend on the amount of air flow, it is necessary to update those values each time the air flow signal Vti is obtained at step 83. FIG. 16 shows at (a) the table of the value of A, at (b) the table of the time constant T2, and at (c) the table of time constant T2, with respect to the amount of air flow.

Figure 17:
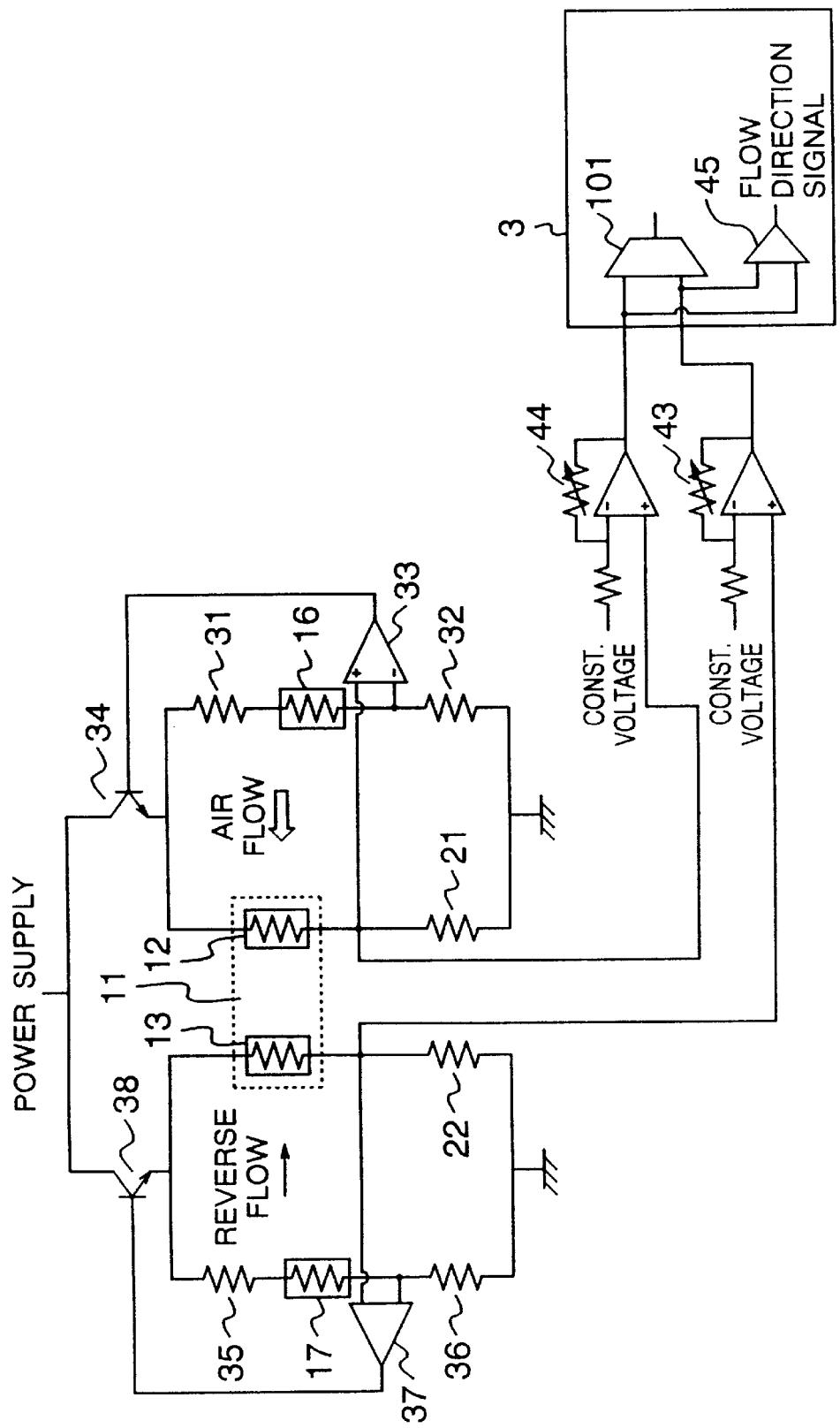
FIG. 17 is still another modification of the circuit diagram of FIG. 3.

Another modification of the invention will be described with reference to FIGS. 17, 18 and 19. FIG. 17 is a modification of the arrangement of FIG. 3. In FIG. 17, like elements corresponding to those in FIG. 3 are identified by the same reference numerals. The signals from the two hot-wire type air flow meters provided along the air flow are fed to zero/span adjusting circuits 43, 44, respectively where their relations with the amount of air flow are adjusted. The output signals from the adjusting circuits 43, 44 are fed to the engine control circuit 3. In the engine control circuit 3, the signals from the two hot-wire type air flow meters are compared by a comparator 45 so that an air flow direction signal is produced from the comparator. At the same time, the two signals are supplied to the multiplexer 101 and the output from the multiplexer is fed to the A/D converter where it is converted into a digital signal.

Figure 18:
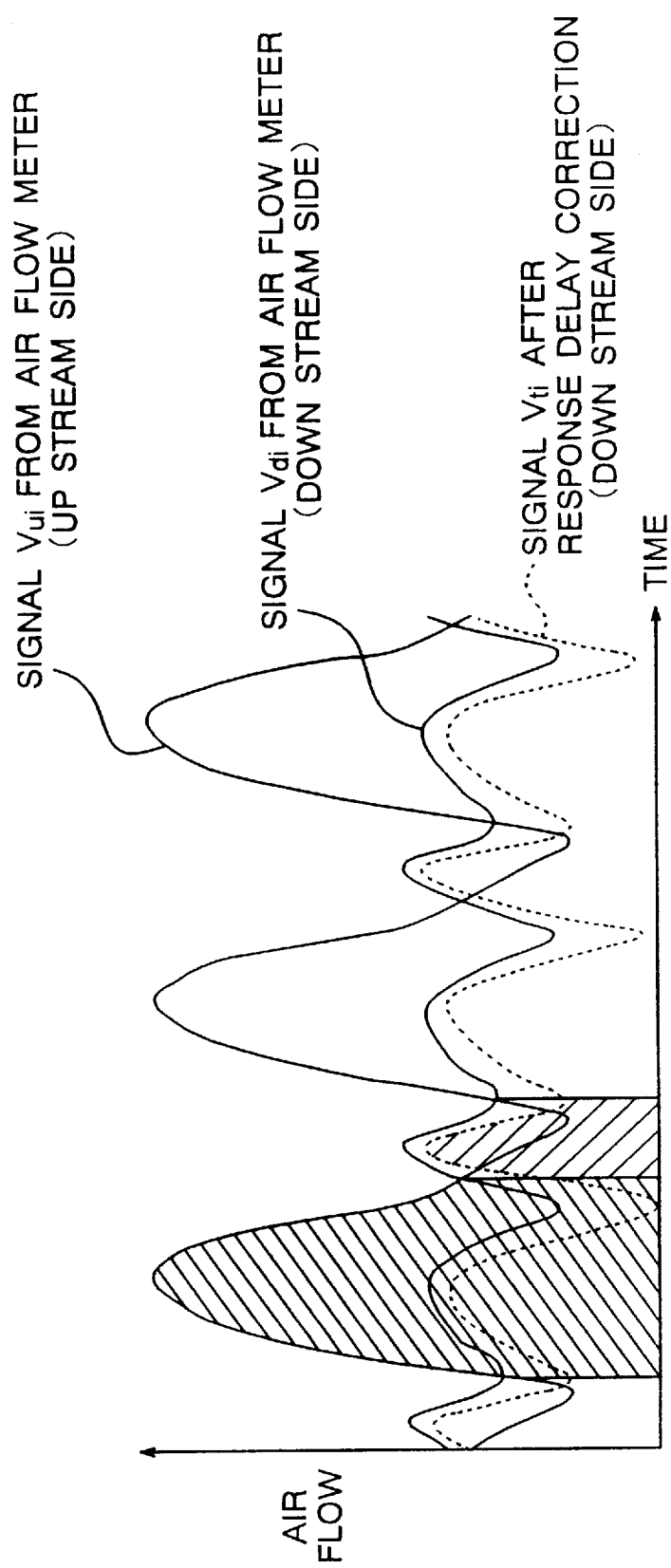
FIG. 18 is a waveform diagram to which reference is made in explaining the signal processing within the engine control circuit 3.

FIG. 18 is a diagram to which reference is made in explaining the signal processing within the engine control circuit 3. The air flow direction signal from the comparator 45 is used. When the flow is forward, the signal from the upstream-side air flow meter is converted to the amount of air flow. When the air flow is reverse, the signal from the downstream-side air flow meter is corrected for its response delay by the same method as in FIG. 15, converted to the amount of air flow and attached with minus sign. Then, those values are accumulated and averaged. According to this method, at the time of reverse flow, the amount of reverse flow can be precisely measured from the signal which is fed from the downstream-side hot-wire type air flow meter and corrected for its response delay. At the time of forward flow, since the amount of air flow is large and has small response delay as shown in FIG. 16, the amount of forward flow can be precisely measured without correcting the response delay from the signal which is produced from the upstream-side hot-wire type air flow meter. As a result, the amount of reverse flow is subtracted from the amount of forward flow and the average amount of air flow can be calculated with high precision.

Figure 19:
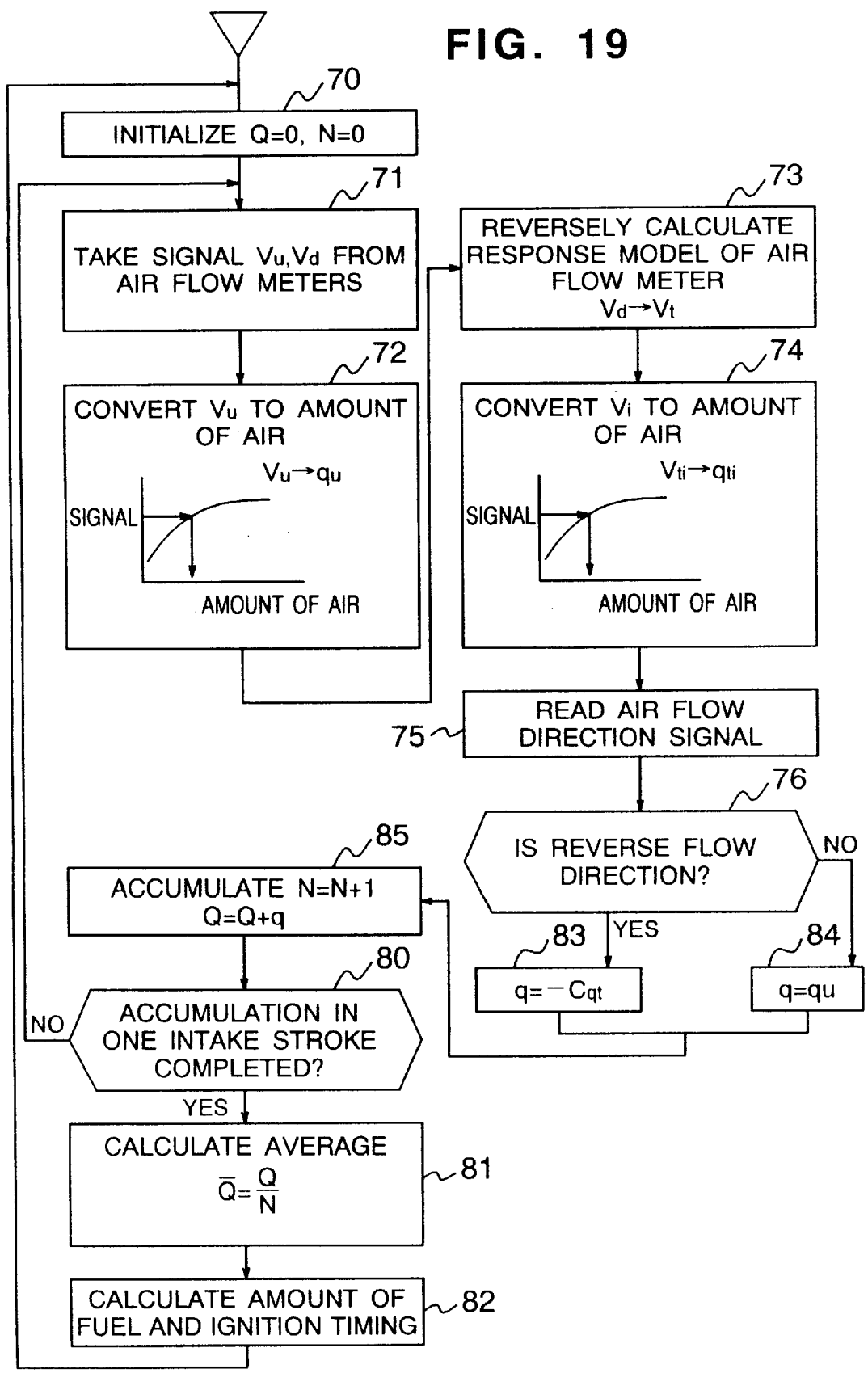
FIG. 19 is a flowchart to which reference is made in explaining the diagram of FIG. 18.

FIG. 19 is a flowchart for the explanatory diagram of FIG. 18. In FIG. 19, like elements corresponding to those in FIG. 12 are identified by the same reference numerals. At step 70 the initial values are reset to zero. At step 71 the signals Vu, Vd from the two hot-wire type air flow meters are received at constant intervals of time or at every constant crank angles. At step 72 the signal Vu from the upstream-side flow meter is converted to the amount of air flow, qu according to the table shown in FIG. 8. At step 73 the flow signal Vt without delay is obtained from the signal Vd from the downstream-side air flow meter by reverse arithmetic operation on the response model of the air flow meter. At step 74 the air flow signal Vt without delay is converted to the amount of air flow, qt according to the table shown in FIG. 8. At steps 75, 76 the air flow is decided to be reverse or forward from the air flow direction signal (the output signal from the comparator 45). If the air flow is forward, at steps 84, 85 the converted value qu to which the upstream-side air flow meter signal Vu is converted is accumulated. If the air flow is reverse, at step 83 the amount qt of air flow after response delay correction is multiplied by a constant c, attached with minus sign and accumulated. At step 80 decision is made of whether the accumulation in one inlet stroke is completed. If it is completed, the program goes to step 81. If it is not completed yet, the program goes back to step 71, repeating the accumulation at step 85. At step 81 the added value Q of air flow is divided by the number of additions N, so that the average value is obtained. At step 82, the amount of fuel to be fed and the ignition timing are calculated.

Figure 21:
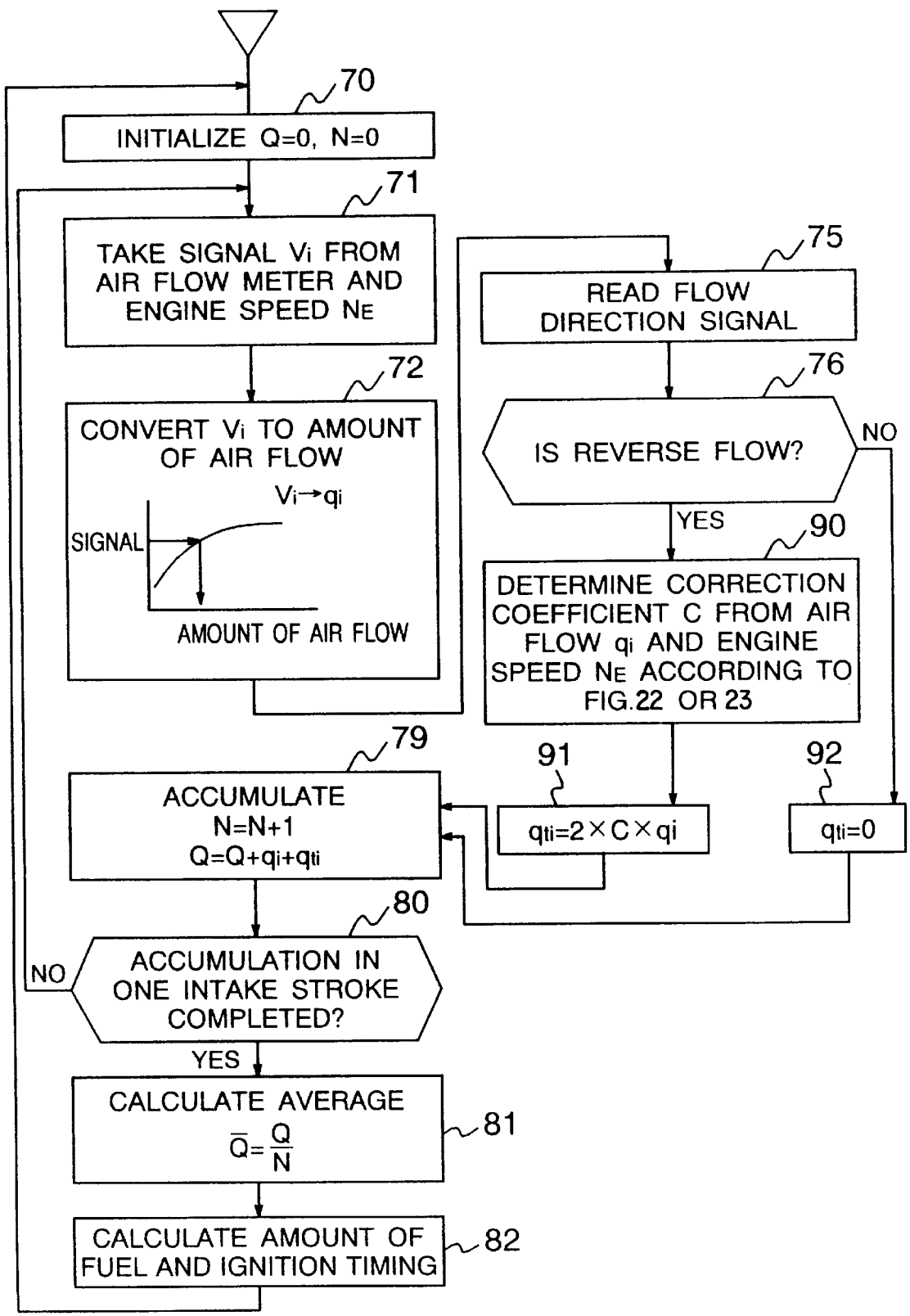
FIG. 21 is a modification of the reverse calculation of response model of hot-wire type air flow meter in FIG. 12.

FIG. 21 shows a modification of the reverse calculation (step 73) on the response model of the hot-wire type flow meter shown in FIG. 12. In FIG. 21, like elements corresponding to those in FIG. 12 are identified by the same reference numerals. In this method, the true amount of air flow is calculated by multiplying the amount of air flow qi by the correction coefficient which is determined from the amount of air flow, qi and engine speed $N_E$ according to the relations shown in FIGS. 22 and 23.

Figure 22:
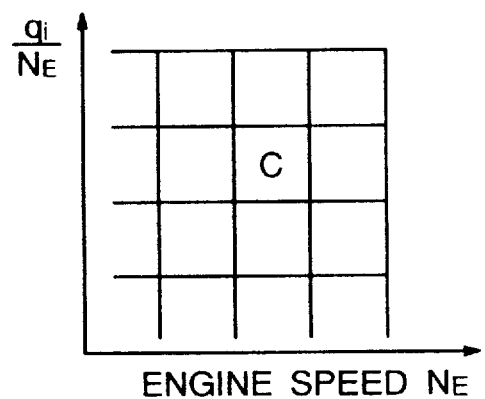
FIG. 22 is a diagram showing a map for finding the correction coefficient.
Figure 23:
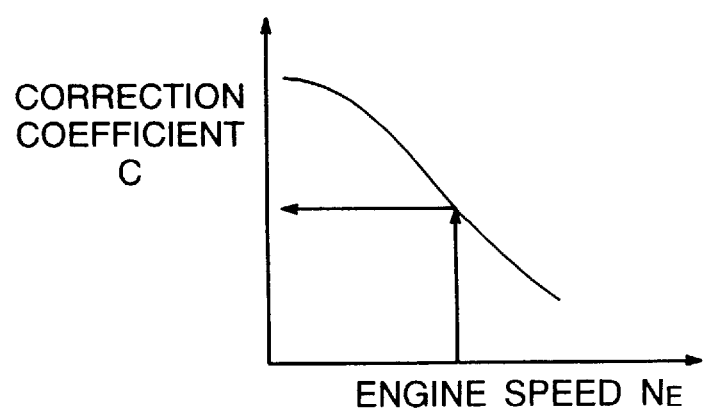
FIG. 23 is a graph showing the relation between revolution rate of engine and correction coefficient.

Specifically, at step 70 the initial values are reset to zero, and at step 71 the signal Vi from the hot-wire type flow meter and engine speed $N_E$ are read at constant intervals of time or at every constant crank angles. At step 72 the signal Vi from the flow meter is converted to the amount qi according to the table shown in FIG. 8. At steps 75, 76 the flow direction signal (the output signal from the comparator 30) is read and decision is made of whether the air flow is forward or reverse. If the air flow is forward, at step 92 the amount of air flow qti during the reverse period is set to zero (qti=0). If the air flow is reverse, at steps 90, 91 the correction coefficient is derived from the amount of air flow qi and engine speed $N_E$ according to the relationship shown in FIG. 22, and the amount of air flow qi and the correction coefficient are multiplied by each other to produce the true amount of reverse air flow, which is further multiplied by −2. At step 79 the amount qi obtained at step 72 is added to the amount of reverse air flow qti produced at steps 91, 92, and the number of additions N is counted. At step 80 decision is made of whether the additions during one inlet stroke are completed. If the accumulation is completed, the program goes to step 81. If it is not completed yet, the program goes back to step 71 and the accumulation at step 79 is repeated. At step 81 the accumulation value Q of those amounts of air flow is divided by the number of additions N so that the average amount of flow is obtained. At step 82 the amount of fuel to be fed and ignition timing are calculated. When the amount of reverse flow is small or when the precision to be required at the time of reverse flow is low, the correction coefficient is determined only by the engine speed as shown in FIG. 22 or 23. In addition, the flow direction may be detected not only by the method shown in FIGS. 3 and 6 but also by the software disclosed in the Japanese Patent Examined Publication No. JP-B-5-10612 and No. JP-B-5-54890.

According to this software, although the table shown in FIGS. 22, 23 is required to be previously obtained by experiment, the differentiation at step 73 (the details shown in FIG. 15) in FIG. 12 is the multiplication by the correction coefficient, and thus even if the air flow signal Vi includes noise, the true amount of air flow can be obtained at high precision.

According to this invention, the average amount of pulsatile air flow including a reverse flow can be precisely measured by the hot-wire type air flow meter with slight response delay. As a result, it is possible to provide a practical engine-controlling air flow meter of which the flow magnitude detector is excellent in its mechanical strength.

Figure 24:
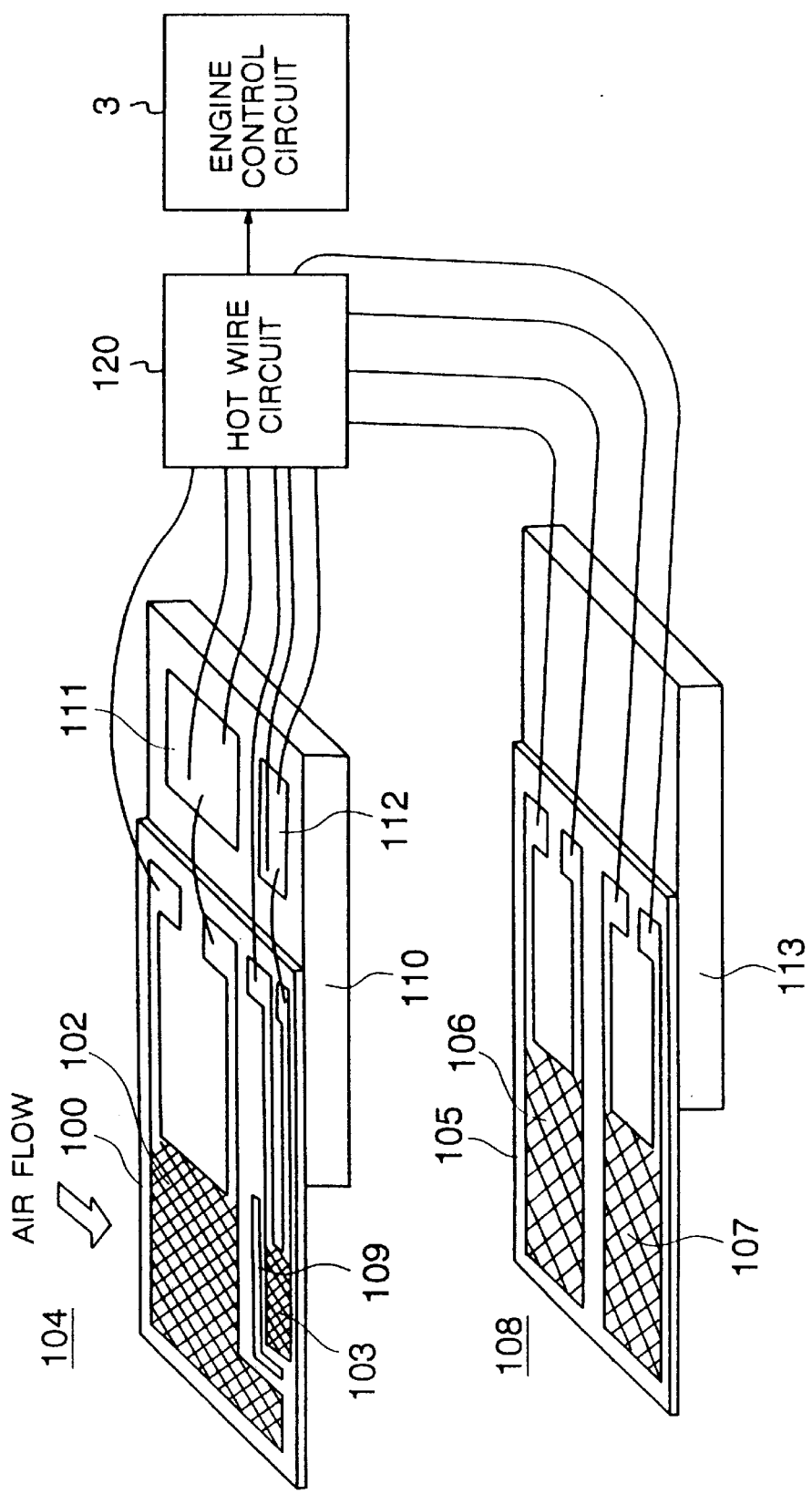
FIG. 24 shows another embodiment of the invention.

FIG. 24 shows another embodiment of the invention. The air flow meter of this embodiment is formed of two hot-wire air flow speed meters of which the heat-generating resistors have different sizes. There is shown a flow-amount detector 104 which has a thin electrically insulating plate (made of a ceramic, plastic or silicon material) 100, two heat-generating resistors 102, 103 of different sizes formed on the plate, and a slit 109 formed in the plate in order for the heat to be less conducted between the two resistors. This flow-amount detector 104 also has a substrate (made of alumina, glass or the like) 110 with resistors 111, 112 formed thereon. The electrically insulating plate 100 is bonded onto the substrate 110 by glass or the like and the resistors are connected by wire bonding. A air temperature detector 108 is formed of an electrically insulating plate (made of a ceramic, plastic or silicon material) 105 with two temperature compensation resistors 106, 107 provided thereon and of a substrate (made of alumina, glass or the like) 113 bonded on the plate with glass. In addition, wiring bonding is made on the ends of the resistors. The air flow-amount detector 104 and the air temperature detector 108 are connected to a hot-wire circuit 120. The air flow signal from the hot-wire circuit 20 is supplied to the engine control circuit 3, where the amount of fuel to be fed and the ignition timing are calculated.

Figure 25:
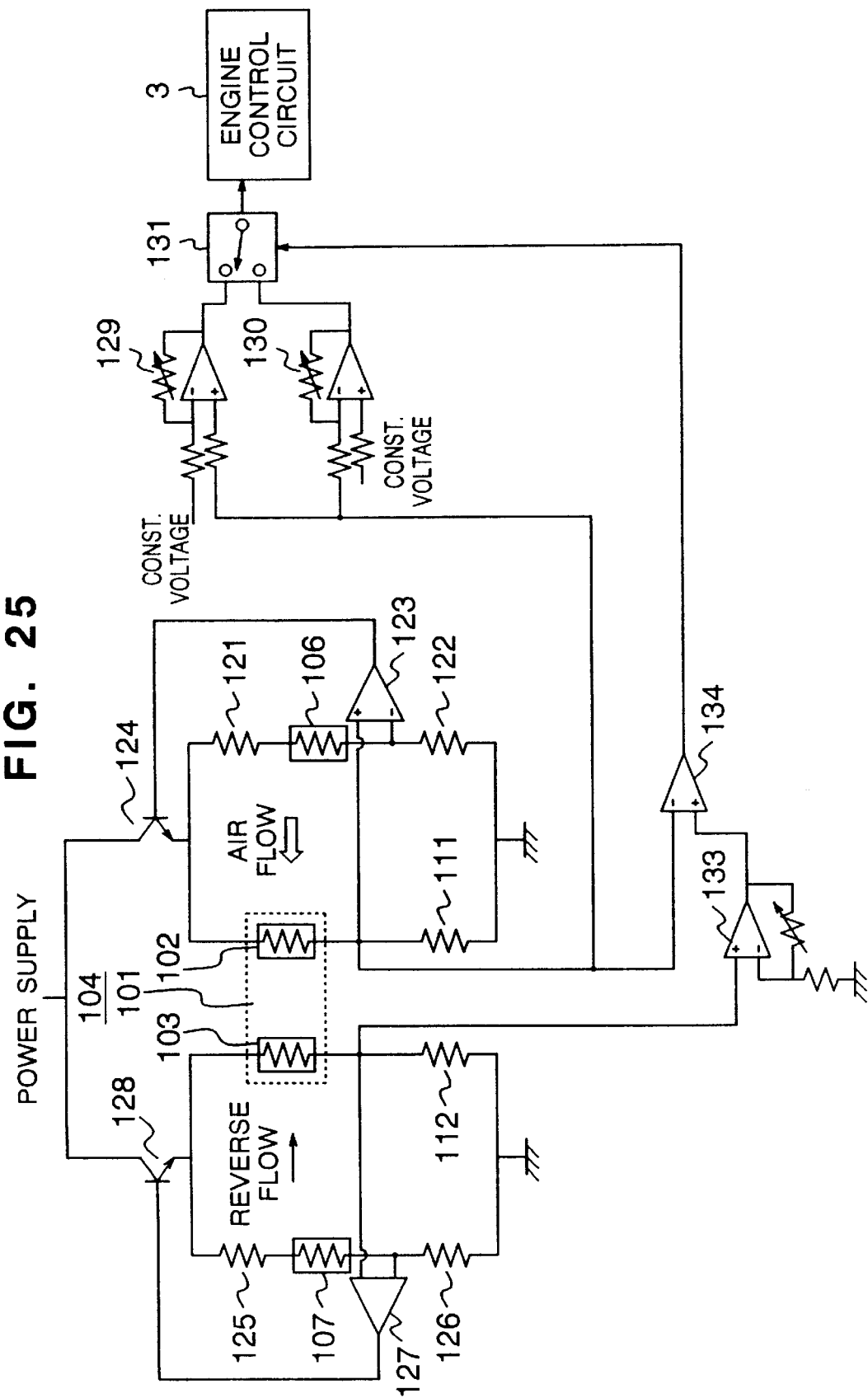
FIG. 25 is a specific diagram of the hot-wire circuit 120.
Figure 26:
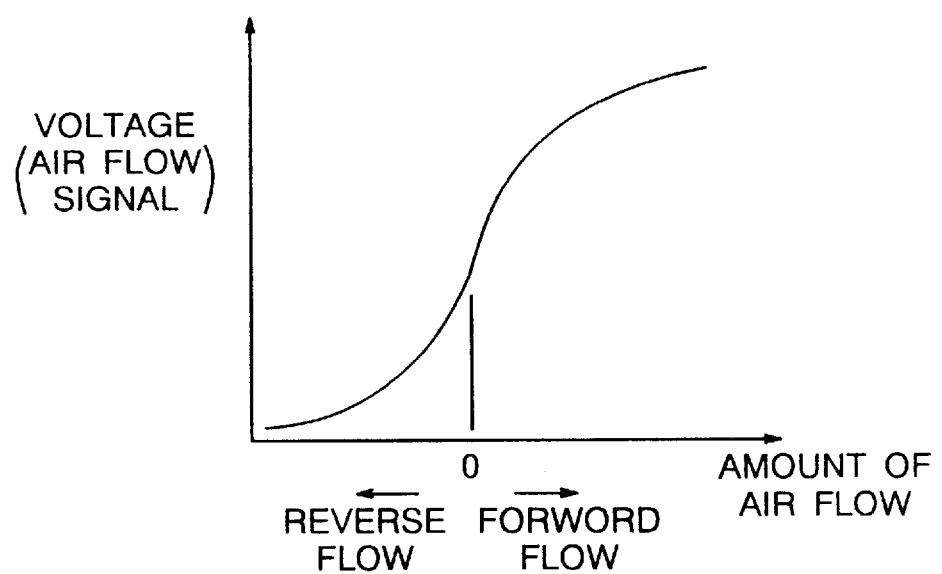
FIG. 26 is a graph showing the relation between signal and air flow including direction.

FIG. 25 is a circuit diagram of the hot-wiring circuit 120. This circuit arrangement includes two hot-wire air flow speed meters which produce different signals. The air flow direction is determined by comparing these signals. The signal from the heat-generating resistor 102 of a larger resistance area is treated as the air flow signal. The air flow signal and the air flow direction signal are combined into an output signal. In FIG. 25, like elements corresponding to those in FIG. 24 are identified by the same reference numerals. One of the air flow speed meters is formed by a Wheatstone bridge having the heat-generating resistor 102, the temperature compensation resistor 106 and resistors 111, 122, 121, a differential amplifier 123, and a transistor 124. The other one is formed of a Wheatstone bridge having the heat-generating resistor 103, temperature compensation resistor 107 and resistors 112, 125, 126, a differential amplifier 127 and a transistor 128. As to the air flow signals from the two hot-wire type air flow meters, the potentials at the lower ends of the heat-generating resistors 102, 103 are compared with each other by the comparator 134 so that the air flow direction signal is obtained. This direction signal is used as a control signal to an analog switch 131. Since the area of the heat-generating resistor 103 is smaller than that of the heat-generating resistor 102, the potential at the lower end of the resistor 103 is smaller than that of the resistor 102. Thus, the potential is amplified, or adjusted by the differential amplifier 133 so that both potentials are equal when the amount of air flow is zero. The output from the amplifier is supplied to the comparator 134, from which the flow direction signal is produced. Since the signal from the upstream-side heat-generating resistor relative to the air flow is larger than that from the downstream-side one, the flow direction signal can be obtained. The flow signal, or the potential at the lower end of the heat-generating resistor 102 of a larger area is adjusted by the differential amplifiers 129, 130. The signals from the amplifiers are selected by the analog switch 131 which is controlled by the flow direction signal so that as shown in FIG. 26, when the air flow is forward, the flow signal is increased with the amount of air flow, and when the flow is reverse, the flow signal is decreased with the amount of air flow. The selected signal is fed to the engine control circuit 3, where the average amount of air is obtained.

FIG. 26 is the relationship between the flow signal and the amount of air flow including the flow direction. Thus, according to the arrangements and characteristics of FIGS. 24, 25, 26, the potential at the lower end of the heat-generating resistor 102 of a larger area is used as the flow signal, and it is substantially equal to the sum of the potentials at the lower ends of the two heat-generating resistors 102, 103. Thus, since the summation can be omitted by changing the areas of the two heat-generating resistors, the signal processing becomes simple. In addition, since the heat conduction between the two heat-generating resistors is suppressed by the slit 109, all heat generated from the two heat-generating resistors can be surely conducted to the air flow. Therefore, the air flow speeds at the respective positions of the heat-generating resistors can be measured with high accuracy. The heat-conduction suppressing means may be a row of holes instead of the slit. Moreover, if the relation between the flow signal and the amount of air flow is established as in FIG. 26 by using the flow direction signal and analog switch 131, the air flow signal including the flow direction can be transmitted through a single signal line to the engine control circuit 3.

Figure 27:
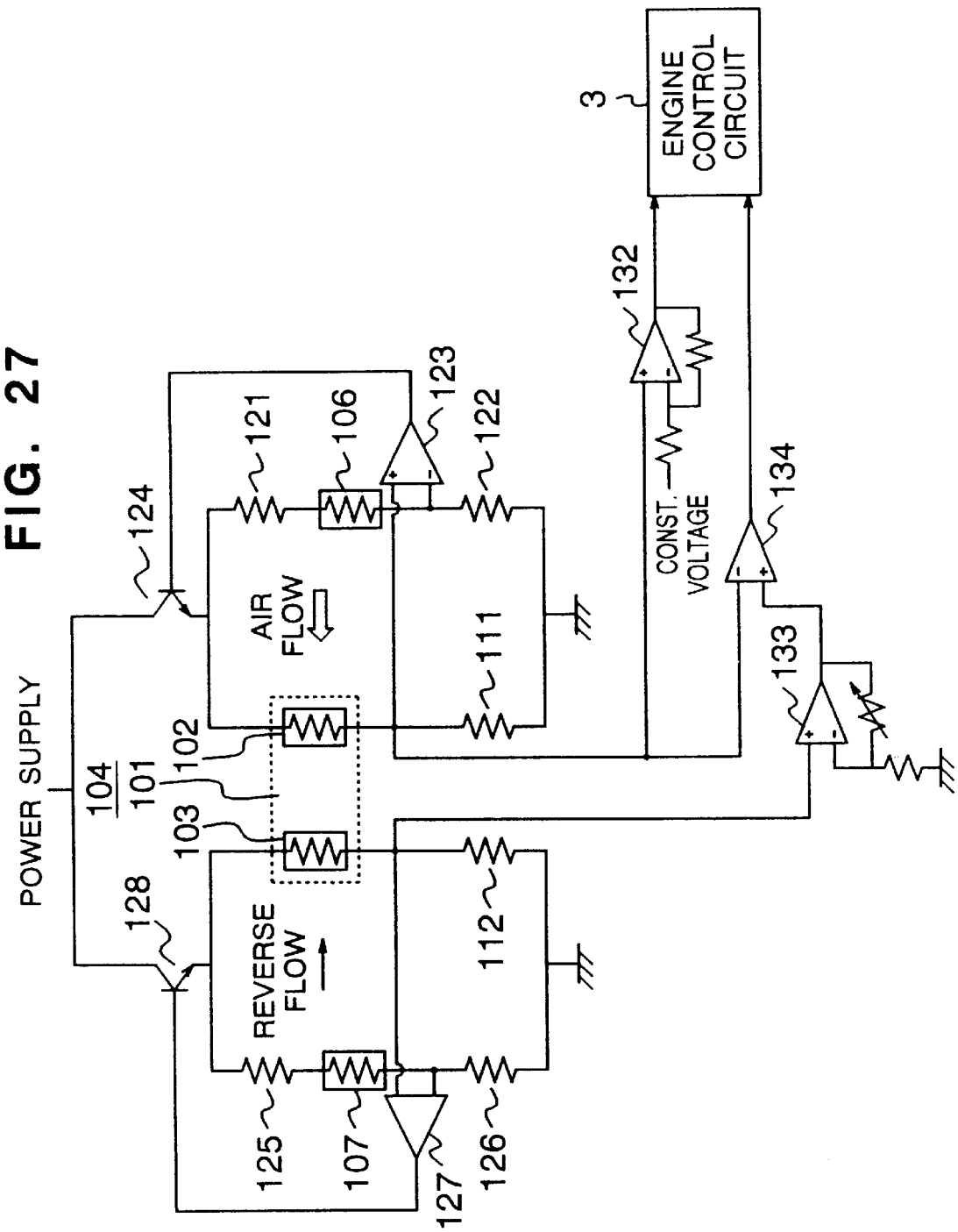
FIG. 27 is a modification of FIG. 25.
Figure 28:
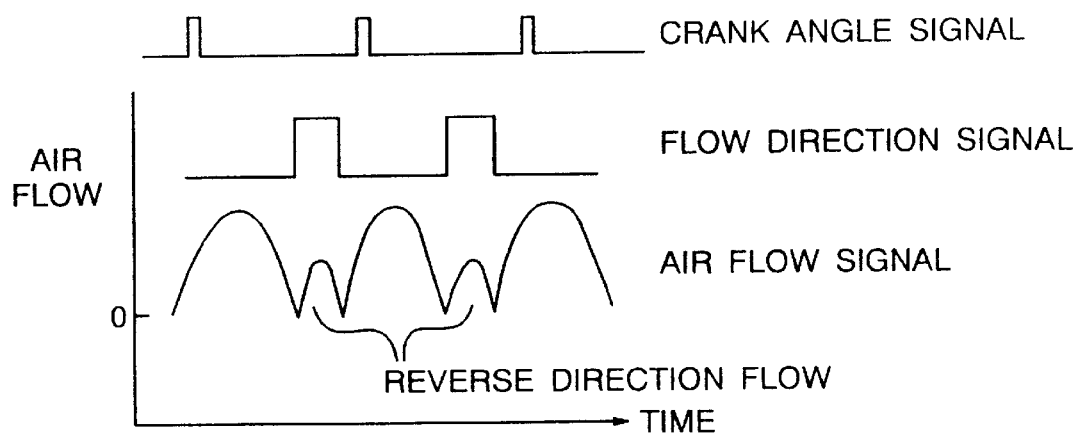
FIG. 28 is a waveform diagram of flow-direction signal and flow signal to the engine control circuit 3.

FIG. 27 is a modification of the arrangement of FIG. 25. The flow direction signal and the air flow signal are separately supplied through two wires to the engine control circuit 3. In FIG. 27, like elements corresponding to those in FIG. 25 are identified by the same reference numerals. The flow signal, or the potential at the lower end of the heat-generating resistor 102 of a larger area is adjusted in the relation of the signal to the amount of air flow by a differential amplifier 132, and fed to the engine control circuit 3. The air flow direction signal is obtained by comparing the potentials at the lower ends of the heat-generating resistors 102, 103 by the comparator 134, and it is fed to the engine control circuit 3. FIG. 28 shows examples of the air flow direction signal and the air flow signal fed to the engine control circuit 3.

Figure 29:
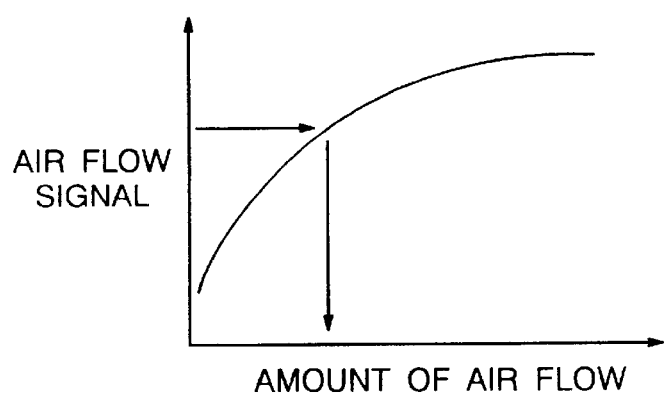
FIG. 29 shows a table for finding air flow from flow signal.
Figure 30:
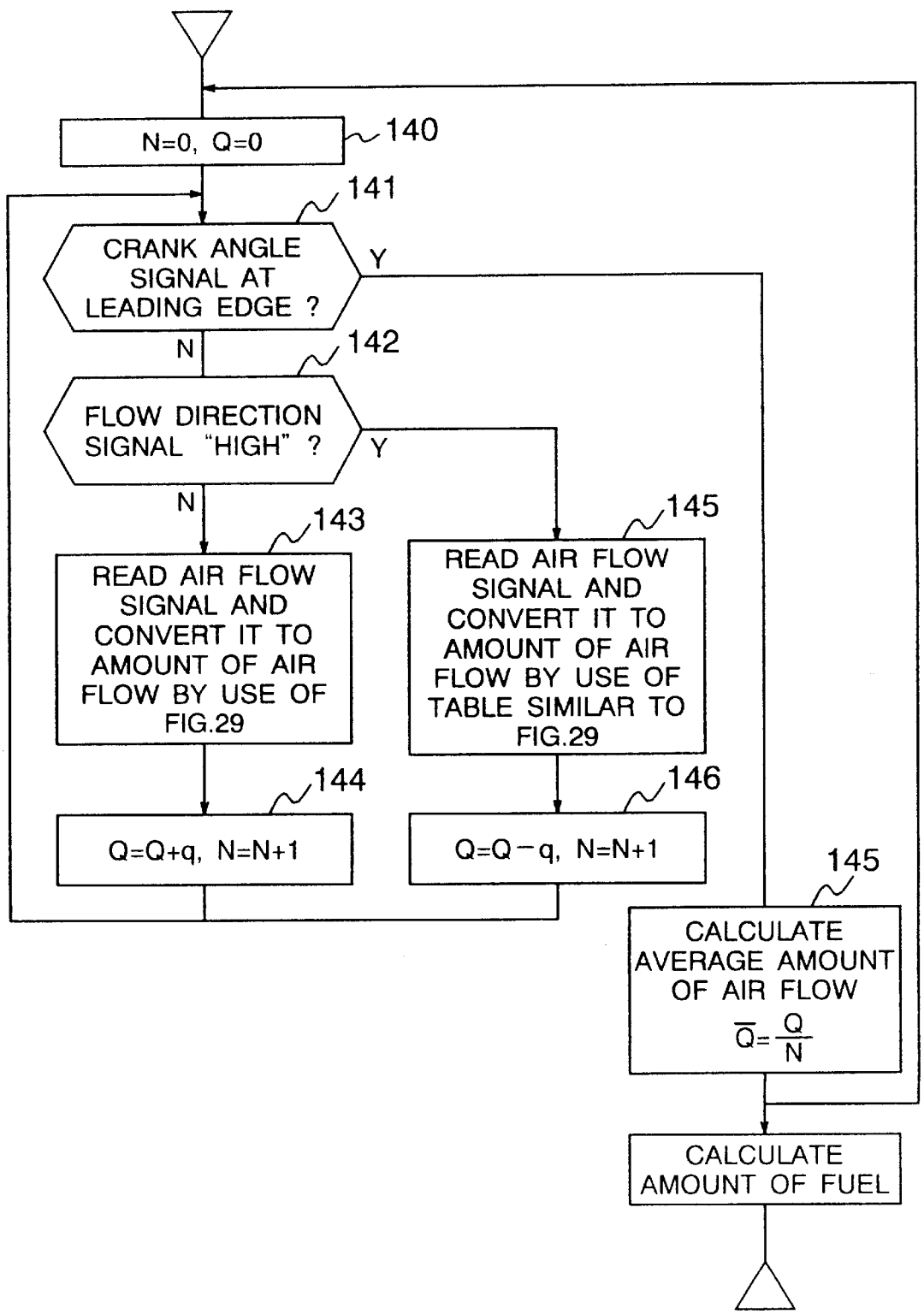
FIG. 30 is a flowchart for signal processing within the engine control circuit 3.

FIG. 30 is a flowchart for the signal processing in the engine control circuit 3. In the flowchart, the air flow signal is converted to an amount of air flow according to the table shown in FIG. 29. If the flow is forward, the air flow signal is added with plus sign. If the air flow is reverse, the air flow signal is added with minus sign. Those amounts of air are accumulated and the average amount of air flow during a crank interval shown in FIG. 28 is calculated. Specifically, at step 140 the initial values are reset to zero, and at step 141 decision is made of whether the crank angle signal is at the leading edge. If it is not at the leading edge, at step 142 the air flow is decided to be forward or reverse according to the air flow direction signal. If the air flow is forward, at step 143 the air flow signal is converted to an amount of air flow according to the table of air flow signal and amount of air shown in FIG. 29. At step 144 this amount is added to the previous one. If the flow is reverse, at step 145 the air flow signal is converted to an amount of air by using the table of air flow signal and amount of air for reverse flow different from that of FIG. 29. At step 146 it is attached with minus sign and added to the previous one. At step 141, if the crank angle signal is at the leading edge, the program goes to step 147, where the average amount of air is calculated by dividing the accumulation value of air amount by the number of additions. Then, the amount of fuel to be fed is determined. In the method shown in FIGS. 27, 28, 29 and 30, since the air flow direction signal and the air flow signal are separately treated, the precision (bit number) of the AD converter to which the flow signal is supplied is not necessary to be particularly increased.

Figure 31:
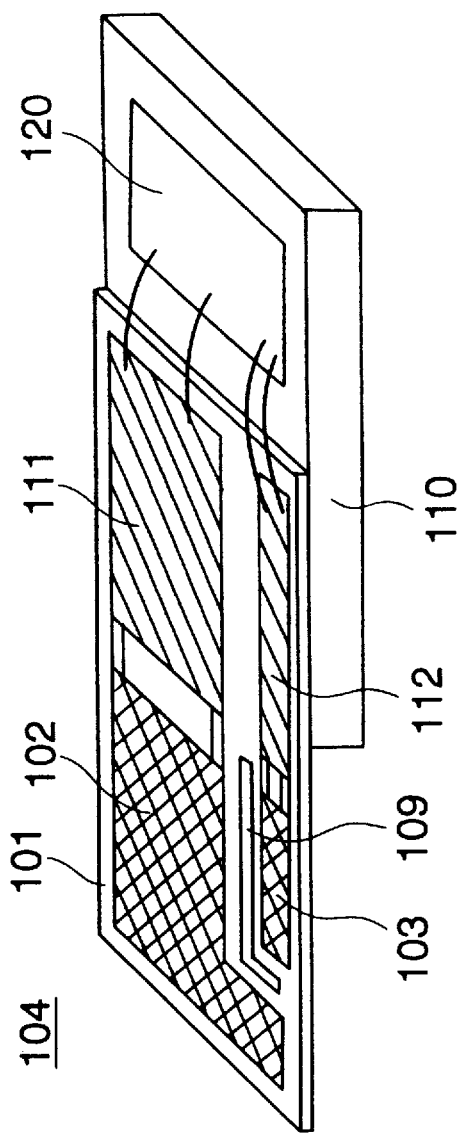
FIG. 31 shows another example of the flow detector 104 in FIG. 24.

FIG. 31 shows another example of the flow-amount detector 104 in FIG. 24. In FIG. 31, like elements corresponding to those in FIG. 25 are identified by the same reference numerals. The resistors 111, 112 connected in series to the heat-generating resistors 102, 103 are provided on the electrically insulating plate 101 so that the heat generated from the resistors 111, 112 can be swiftly removed and that a part of the amount of heat generated from the heat-generating resistors 102, 103 which part is conducted to the substrate 110 is reduced by the heat generation of the resistors 111, 112 themselves, thereby improving the precision of the air flow meter.

According to the present invention, when the air flow is a pulsatile flow including a reverse flow as when a throttle valve is fully open, the magnitude and direction of the air flow are calculated at certain intervals of time. If the air flow is reverse, the air flow signal is attached with minus sign and added and the average amount of air is calculated. Thus, the average amount of air flow can be precisely calculated even if the flow is a pulsatile flow including a reverse flow. In addition, since the potential at the lower end of the heat-generating resistor 102 of a large area is used as the air flow signal, it is substantially equal to the sum of the potentials at the lower ends of the two heat-generating resistors 102, 103, and thus the summation is not necessary so that the signal processing is simple. Moreover, since the relation between the amount of air flow and the signal is established as shown in FIG. 26 by using the air flow direction signal and analog switch 131, the flow signal including the air flow direction can be transmitted through a single signal line to the engine control circuit 3.

What is claimed is:

1. An intake air flow measuring apparatus for measuring pulsatile air flow including reverse flow, comprising:
   a thermal type air flow meter provided within an air path of an engine and having two heat-generating resistors arranged upstream and downstream of said air path so that the air flow passes through the upstream heat-generating resistor passes through the downstream heat-generating resistor for detecting an amount of said air flow on the basis of signals from said two heat-generating resistors;
   means for correcting a response delay in a signal corresponding to an amount of air flow detected by said thermal type air flow meter;
   means for detecting a direction of the air flow in said air path; and
   means for obtaining a true average value of the air flow within predetermined crank angles such that, when said means for detecting a direction of the air flow has detected a reverse air flow within said predetermined crank angles, said average value is obtained on the basis of both of the signal corresponding to an amount of air flow detected by said air flow meter and the signal corrected by said correcting means within said predetermined crank angles, and, when said means for detecting a direction of the air flow has detected a forward air flow, said average value in obtained on the basis of the signal corresponding to an amount of air flow detected by said air flow meter.

2. An intake air flow measuring apparatus according to claim 1, wherein said means for obtaining a true average value obtains the true average value on the basis of the signal corresponding to an amount of air flow detected by said air flow meter when reverse air flow is undetected by said means for detecting a direction of the air flow during a predetermined rotational crank angle.

3. An intake air flow measuring apparatus according to claim 1, wherein a rectifying member is provided at the inlet and outlet of an air path.

4. An intake air flow measuring apparatus according to claim 1, wherein said thermal type air flow meter has two heat-generating resistors arranged forward and backward with respect to said air flow, a flow signal is determined by the sum of signals from said resistors, and a flow direction signal is obtained by comparing said signals.

5. An intake air flow measuring apparatus according to claim 1, wherein an switch is operated by a flow direction signal so that a flow signal is made to increase with the air flow when the air flow is forward, and decrease with the air flow when the air flow is reverse.

6. An intake air flow measuring apparatus, comprising a thermal type air flow meter upstream and downstream with respect to an air path, so that the air flow passed through the upstream heat-generating resistor passes through the downstream heat-generating resistor for detecting an amount of said air flow on the basis of signals from said two heat-generating resistors, wherein on the basis of a flow direction signal, a signal from the upstream heat-generating resistor is converted to an amount of air flow when the air flow is forward and a signal from the downstream heat generating resistor is corrected for its response delay, means for detecting a direction of the air flow in said air path; and means for obtaining a true average value of the air flow within predetermined crank angles such that, when said means for detecting a direction of the air flow has detected a reverse air flow within said predetermined crank angles, paid average value is obtained on the basis of both of the signal corresponding to an amount of airflow detected by said air flow meter and the signal corrected within said predetermined crank angles, and, when said means for detecting a direction of the air flow has detected forward air flow, said average value-is obtained on the basis of the signal corresponding to an amount of air flow detected by said flow meter.

7. An air flow meter comprising two heat-generating resistors provided within an air intake path of an engine and arranged upstream and downstream with respect to an air flow, so that the air flow passes through the upstream heat-generating resistor passes through the downstream heat-generating resistor for detecting an amount of said air flow on the basis of signals from said two heat-generating resistors, wherein said two heat-generating resistors are so constructed as to generate amounts of heat substantially different from each other, and arranged to be close to each other so that the air flow heated by one of said heat-generating resistors affects the amount of heat generated from the other one, a flow direction signal is determined by the difference between the signals from said two heat-generating resistors, and an air flow signal is produced from said greater-heat generating one of said heat-generating resistors to provide means for detecting a direction of the air flow in said path; and means for obtaining a true average value of flow within said predetermined crank angles such that, when said means for detecting a direction of the air flow has detected a reverse air flow within said predetermined crank angles, said average value is obtained on the basis of both of the signal corresponding to an amount of air flow detected by said air flow meter and the signal corrected within said predetermined crank angles, and, when said means for detecting a direction of the air flow has detected a forward air flow, said average value is obtained on the basis of the signal corresponding to an amount of air flow detected by said air flow meter.

8. An air flow meter having two heat-generating resistors provided within an air intake path of an engine and arranged forward and backward with respect to an air flow, wherein said two heat-generating resistors are so constructed as to generate greatly different amounts of heat from each other, and arranged to be close to each other so at the air flow heated by one of said heat-generating resistors affects the amount of heat generated from the other one, a flow direction signal in determined by the difference between the signals from said two heat-generating resistors, and an air flow signal is produced from said greater-heat generating one of said heat-generating resistors wherein an area of one of said two heat-generating resistors is larger than that of the other one.

9. An air flow meter having two heat-generating resistors provided within an air intake path of engine and arranged forward and backward with respect to an air flow, wherein said two heat-generating resistors are so constructed as to generate greatly different amounts of heat from each other, and arranged to be close to each other so that the air flow heated by one of said heat-generating resistors affects the amount of heat generated from the other one, a flow direction signal is determined by the difference between the signals from said two heat-generating resistors, and an air flow signal is produced from said greater-heat generating one of said heat-generating resistors wherein heat-conduction suppressing means such as a slit or holes is provided between said two heat-generating resistors.

10. An intake air flow measuring apparatus for measuring pulsatile air flow including reverse flow, comprising:

a thermal type air flow meter provided within an air path of an engine for detecting air flow and having two heat-generating resistors arranged upstream and downstream of said air path so that the pair flow passed through the unstream heat-generating resistor passes through the downstream heat-generating resistor for detecting an amount of said air flow on the basis of signals from said two heat-generating resistors;

means for detecting a direction of the air flow in said air path;

means for correcting a response delay in a signal corresponding to an amount of air flow detected by said thermal type air flow meter when the reverse air flow is detected by said means for detecting a direction of the air flow;

means for obtaining a correction value by multiplying the corrected signal of said correcting means by a predetermined constant value;

means for accumulating amount of air flow detected by said air flow meter during a predetermined rotational crank angle; and means for obtaining a true average value of the air flow within predetermined crank angles such that, when said means for detecting a direction of the air flow has detected reverse air flow within said predetermined crank angles, said average value is obtained on the basis of both of the signal corresponding to an amount of air flow detected by said air flow meter and the signal corrected by said correcting means within said predetermined crank angles, and, when said means for detecting a direction of the air flow has detected a forward air flow, said average value in obtained on the basis of the signal corresponding to an amount of air flow detected by said air flow meter.

11. An intake air flow measuring apparatus according to claim 10, wherein said means for obtaining a true average value obtains the true average value on the basis of the signal corresponding to an amount of air flow detected by said air flow meter without the correction value when reverse air flow is undetected by said means for detecting a direction of the air flow during a predetermined rotational crank angle.

* * * * *